(12) United States Patent
Mellors et al.

(10) Patent No.: US 11,635,407 B2
(45) Date of Patent: *Apr. 25, 2023

(54) PRESSURE DRIVEN FLUIDIC INJECTION FOR CHEMICAL SEPARATIONS

(71) Applicant: The University of North Carolina at Chapel Hill, Chapel Hill, NC (US)

(72) Inventors: John Scott Mellors, Carrboro, NC (US); Erin Anne Redman, Carrboro, NC (US); John Michael Ramsey, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,265

(22) Filed: Aug. 3, 2020

(65) Prior Publication Data

US 2021/0210325 A1 Jul. 8, 2021

Related U.S. Application Data

(63) Continuation of application No. 15/570,505, filed as application No. PCT/US2016/031626 on May 10, (Continued)

(51) Int. Cl.
*G01N 27/447* (2006.01)
*H01J 49/16* (2006.01)
(Continued)

(52) U.S. Cl.
CPC .... *G01N 27/44743* (2013.01); *B01L 3/50273* (2013.01); *G01N 27/4473* (2013.01); (Continued)

(58) Field of Classification Search
None
See application file for complete search history.

(56) References Cited

U.S. PATENT DOCUMENTS 4,885,076 A * 12/1989 Smith ............... G01N 27/4473
250/288
5,872,010 A 2/1999 Karger et al.
(Continued)

FOREIGN PATENT DOCUMENTS

EP 2 184 602 A1 5/2010
JP 2000-310613 11/2000
(Continued)

OTHER PUBLICATIONS

Dietze et al., "integrated on-chip mass spectrometry reaction monitoring in microfluidic devices containing porous polymer monolithic columns," Analyst, The Royal Society of Chemistry 2016, DOI: 10.1039/c6an01467d, pages unnumbered (Year: 2016).*
(Continued)

*Primary Examiner* — Alexander S Noguerola
(74) *Attorney, Agent, or Firm* — Myers Bigel, P.A.

(57) ABSTRACT

Methods, systems and devices that allow independently applied pressures to a BGE reservoir and a sample reservoir for pressure-driven injection that can inject a discrete sample plug into a separation channel that does not require voltage applied to the sample reservoir and can allow for in-channel focusing methods to be used. The methods, systems and devices are particularly suitable for use with a mass spectrometer.

20 Claims, 17 Drawing Sheets

Related U.S. Application Data 2016, now Pat. No. 10,734,216, which is a continuation-in-part of application No. 14/987,326, filed on Jan. 4, 2016, now Pat. No. 9,606,082, which is a continuation of application No. 14/708,906, filed on May 11, 2015, now Pat. No. 9,255,905.

(51) Int. Cl.
*G01N 30/16* (2006.01)
*B01L 3/00* (2006.01)
*G01N 30/72* (2006.01)
*B05B 5/00* (2006.01)

(52) U.S. Cl.
CPC ....... *G01N 27/44791* (2013.01); *G01N 30/16* (2013.01); *H01J 49/165* (2013.01); *H01J 49/167* (2013.01); *B01L 2200/0605* (2013.01); *B01L 2300/0816* (2013.01); *B01L 2300/0864* (2013.01); *B01L 2400/049* (2013.01); *B01L 2400/0418* (2013.01); *B01L 2400/0421* (2013.01); *B01L 2400/0487* (2013.01); *B01L 2400/0622* (2013.01); *B01L 2400/0666* (2013.01); *B01L 2400/0694* (2013.01); *B05B 5/00* (2013.01); *G01N 30/7266* (2013.01); *G01N 2030/167* (2013.01)

(56) References Cited

U.S. PATENT DOCUMENTS

| | | | |
|---|---|---|---|
| 5,958,203 | A | 9/1999 | Parce et al. |
| 6,074,827 | A | 6/2000 | Nelson et al. |
| 6,268,220 | B1 | 7/2001 | Heinecke |
| 6,375,817 | B1 | 4/2002 | Taylor et al. |
| 6,475,363 | B1 | 11/2002 | Ramsey |
| 6,833,068 | B2 | 12/2004 | Paul et al. |
| 7,391,020 | B2 | 6/2008 | Bousse et al. |
| 7,494,577 | B2 | 2/2009 | Williams et al. |
| 7,749,365 | B2 | 7/2010 | Nguyen et al. |
| 7,846,314 | B2 | 12/2010 | Gassmann |
| 7,927,476 | B2 | 4/2011 | Tian et al. |
| 9,006,648 | B2 | 4/2015 | Ramsey et al. |
| 9,139,426 | B2 | 9/2015 | Ramsey et al. |
| 9,255,905 | B1 * | 2/2016 | Mellors ............ G01N 27/44743 |
| 10,734,216 | B2 * | 8/2020 | Mellors ............ G01N 27/44743 |
| 2001/0005489 | A1 | 6/2001 | Roach et al. |
| 2001/0035351 | A1 | 11/2001 | Simpson et al. |
| 2002/0008029 | A1 * | 1/2002 | Williams ......... G01N 27/44791 |
| | | | 204/600 |
| 2002/0112959 | A1 | 8/2002 | Xue et al. |
| 2002/0115293 | A1 | 8/2002 | Ghodsian |
| 2002/0189946 | A1 | 12/2002 | Wainright et al. |
| 2004/0088762 | A1 | 5/2004 | Oriedo et al. |
| 2004/0195099 | A1 | 10/2004 | Jacobson et al. |
| 2004/0224425 | A1 | 11/2004 | Gjerde et al. |
| 2005/0118599 | A1 | 6/2005 | Pawliszyn |
| 2006/0254915 | A1 | 11/2006 | Hirokawa et al. |
| 2007/0111329 | A1 | 5/2007 | Guzman |
| 2007/0134808 | A1 | 6/2007 | Sullivan |
| 2007/0145262 | A1 | 6/2007 | Tai et al. |
| 2010/0084271 | A1 | 4/2010 | Santiago et al. |
| 2011/0133077 | A1 | 6/2011 | Henion et al. |
| 2013/0327936 | A1 | 12/2013 | Ramsey et al. |
| 2014/0238856 | A1 | 8/2014 | Ramsey et al. |
| 2014/0272958 | A1 | 9/2014 | Ramsey et al. |
| 2014/0360877 | A1 | 12/2014 | Ramsey et al. |
| 2015/0099642 | A1 | 4/2015 | Barany et al. |

FOREIGN PATENT DOCUMENTS

| | | |
|---|---|---|
| WO | WO 98/04909 A1 | 2/1998 |
| WO | WO 01/69226 A1 | 9/2001 |
| WO | WO 2012/040098 A2 | 3/2012 |
| WO | WO 2012/125318 A2 | 9/2012 |

OTHER PUBLICATIONS

Annesley "Ion Suppression in Mass Spectrometry" *Clinical Chemistry* 49(7):1041-1044 (2003).

Apffel et al. "Enhanced sensitivity for peptide mapping with electrospray liquid chromatography-mass spectrometry in the presence of signal suppression due to trifluoroacetic acid-containing mobile phases" *Journal of Chromatography A* 712:177-190 (1995).

Au et al. "3D-printed microfluidic automation" *Lab Chip* 15:1934-1941 (2015).

Batz et al. "Chemical Vapor Deposition of Aminopropyl Silanes in Mircrofluidic Channels for Highly Efficient Microchip Capillary Electrophoresis Electrospray Ionization-Mass Spectrometry" *Anal. Chem* 86:3493-3500 (2014).

Black et al. "Utilizing Microchip Capillary Electrophoresis Electrospray Ionization for Hydrogen Exchange Mass Spectrometry" *Analytical Chemistry* 87:6280-6287 (2015).

Breadmore et al. "Recent advances in enhancing the sensitivity of electrophoresis and electrochromatography in capillaries and microchips (2008-2010)" *Electrophoresis* 32:127-148 (2011).

Breadmore et al. "Recent advances in enhancing the sensitivity of electrophoresis and electrochromatography in capillaries and microchips (2010-2012)" *Electrophoresis* 34:29-54 (2013).

Broyles et al. "Sample Filtration, Concentration, and Separation Integrated on Microfluidic Devices" *Analytical Chemistry* 75(11):2761-2767 (2003).

Busnel et al. "High Capacity Capillary Electrophoresis-Electrospray Ionization Mass Spectrometry: Coupling a Porous Sheathless Interface with Transient-Isotachophoresis" *Analytical Chemistry* 82(22):9476-9483 (2010).

Chambers et al. "Monolithic Integration of Two-Dimensional Liquid Chromatography-Capillary Electrophoresis and Electrospray Ionization on a Microfluidic Device" *Anal. Chem.*, 83:842-849 (2011).

Cho et al. "Bias-free pneumatic sample injection in microchip electrophoresis" *Journal of Chromatography A* 1063:253-256 (2005).

Dahlin et al. "Poly(dimethylsiloxane)-Based Microchip for Two-Dimensional Solid-Phase Extraction-Capillary Electrophoresis with an Integrated Electrospray Emitter Tip" *Analytical Chemistry* 77(16):5356-5363 (2005).

De Oliveira et al. "20 Years of Fatty Acid Analysis by Capillary Electrophoresis" *Molecules* 19:14094-14113 (2014).

Dennis et al. "Development of a Photothermal Absorbance Detector for Use with Microfluidic Devices" *Analytical Chemistry* 82(10):4063-4071 (2010).

Ermakov et al. "Computer Simulations of Electrokinetic Injection Techniques in Microfluidic Devices" *Analytical Chemistry* 72(15):3512-3517 (2000).

Fenn et al. "Electrospray Ionization for Mass Spectrometry of Large Biomolecules" *Science* 246:64-71 (1989).

Foote et al. "Preconcentration of Proteins on Microfluidic Devices Using Porous Silica Membranes" *Analytical Chemistry* 77(1):57-63 (2005).

Gilar et al. "Mixed-mode chromatography for fractionation of peptides, phosphopeptides, and sialylated glycopeptides" *Journal of Chromatography A* 1191:162-170 (2008).

Gong et al. "Study of injection bias in a simple hydrodynamic injection in microchip CE" *Electrophoresis* 28:1564-1571 (2007).

Guetschow et al. "Subsecond Electrophoretic Separations from Droplet Samples for Screening of Enzyme Modulators" *Analytical Chemistry* 86:10373-10379 (2014).

Hernandez et al. "Analysis of Opioid Peptides by On-Line SPE-CE-ESI-MS" *Electrophoresis* 28:3957-3965 (2007).

Hua et al. "On-chip solid phase extraction and enzyme digestion using cationic PolyE-323 Coatings and porous polymer monoliths coupled to electrospray mass spectrometry" *Journal of Chromatography A* 1218:4039-4044 (2011).

Ibanez et al. "Metabolomics, peptidomics and proteomics applications of capillary electrophoresis-mass spectrometry in Foodomics: A review" *Analytica Chimica Acta* 802:1-13 (2013).

(56) References Cited

OTHER PUBLICATIONS

International Search Report and the Written Opinion of the International Searching Authority corresponding to International Patent Application No. PCT/US2016/031626 (21 pages) (dated Jul. 28, 2016).
Jacobson et al. "Microchip Capillary Electrophoresis with an Integrated Postcolumn Reactor" *Analytical Chemistry* 66(20):3472-3476 (1994).
Jemere et al. "An integrated solid-phase extraction system for sub-picomolar detection" *Electrophoresis* 23:3537-3544 (2002).
Jorgenson et al. "Free-Zone Electrophoresis in Glass Capillaries" *Clinical Chemistry* 27(9):1551-1553 (1981).
Kang et al. "Polymer monolith-integrated multilayer poly(dimethylsiloxane) microchip for online microextraction and capillary electrophoresis" *Electrophoresis* 31:3028-3034 (2010).
Kašička et al. "Isotachophoretic Electrodesorption of Proteins From An Affinity Adsorbent On A Microscale" *Journal of Chromatography* 273:117-128 (1983).
Kitagawa et al. "Recent applications of on-line sample preconcentration techniques in capillary electrophoresis" *Journal of Chromatography A* 1335:43-60 (2014).
Lazar et al. "Subattomole-Sensitivity Microchip Nanoelectrospray Source with Time-of-Flight Mass Spectrometry Detection" *Anal. Chem.* 71:3627-3631 (1999).
Lazar et al. "Novel microfabricated device for electrokinetically induced pressure flow and electrospray ionization mass spectrometry" *Journal of Chromatography A* 892:195-201 (2000).
Lazar et al. "On-Chip Proteolytic Digestion and Analysis Using 'Wrong-Way-Round' Electrospray Time-of-Flight Mass Spectrometry" *Anal. Chem.* 73:1733-1739 (2001).
Lee et al. "Pressure-Driven Sample Injection with Quantitative Liquid Dispensing for On-Chip Electrophoresis" *Analytical Sciences* 20:483-487 (2004).
Lee et al. "Control-free Air Vent System for Ultra-low Volume sample Injection on a Microfabricated Device" *Analytical Sciences* 21:465-468 (2005).
Li et al. "Separation and Identification of Peptides from Gel-Isolated Membrane Proteins Using a Microfabricated Device for Combined Capillary Electrophoresis/Nanoelectrospray Mass Spectrometry" *Analytical Chemistry* 72(3):599-609 (2000).
Li et al. "A novel mixed-mode solid phase extraction coupled with LC-MS/MS for the re-evaluation of free 3-nitrotyrosine in human plasma as an oxidative stress biomarker" *Talanta* 140:45-51 (2015).
Long et al. "Integrated multilayer microfluidic device with a nanoporous membrane interconnect for online coupling of solid-phase extraction to microchip electrophoresis" *Lab Chip* 7:1819-1824 (2007).
Mallet et al. "A study of ion suppression effects in electrospray ionization from mobile phase additives and solid-phase extracts" *Rapid Communications in Mass Spectrometry* 18:49-58 (2004).
Marchiarullo et al. "Towards an integrated microfluidic device for spaceflight clinical diagnostics Microchip-based solid-phase extraction of hydroxyl radical markers" *Journal of Chromatography A* 1200:198-203 (2008).
Medina-Casanellas et al. "Transient isotachophoresis in on-line solid phase extraction capillary electrophoresis time-of-flight-mass spectrometry for peptide analysis in human plasma" *Electrophoresis* 32:1750-1759 (2011).
Mellors et al. "Fully Integrated Glass Microfluidic Device for Performing High-Efficiency Capillary Electrophoresis and Electrospray Ionization Mass Spectrometry" *Anal. Chem.* 80:6881-6887 (2008).
Mellors et al. "Integrated Microfluidic Device for Automated Single Cell Analysis Using Electrophoretic Separation and Electrospray Ionization Mass Spectrometry" *Anal. Chem.* 82:967-973 (2010).
Mellors et al. "Hybrid Capillary/Microfluidic System for Comprehensive Online liquid Chromatography-Capillary Electrophoresis-Electrospray Ionization-Mass Spectrometry" *Anal. Chem.* 85:4100-4106 (2013).
Nge et al. "Ion-permeable membrane for on-chip preconcentration and separation of cancer marker proteins" *Electrophoresis* 32:1133-1140 (2011).
Nge et al. "Microfluidic chips with reversed-phase monoliths for solid phase extraction and on-chip labeling" *J. Chromatogr A* 1261:129-135 (2012).
Nge et al. "Integrated Affinity and Electrophoresis Systems for Multiplexed Biomarker Analysis, Clinical Applications of Capillary Electrophoresis Methods and Protocols" *Methods in Molecular Biology* 919:189-201 (2013).
Nie et al. "An automated integrated platform for rapid and sensitive multiplexed protein profiling using human saliva samples" *Lab Chip* 14:1087-1098 (2014).
Nuchtavorn et al. "Recent applications of microchip electrophoresis to biomedical analysis" *Journal of Pharmaceutical and Biomedical Analysis* 113:72-96 (2015).
Oblath et al. "A microfluidic chip integrating DNA extraction and real-time PCR for the detection of bacteria in saliva" *Lab Chip* 13:1325-1332 (2013).
Oleschuk et al. "Trapping of Bead-Based Reagents within Microfluidic Systems: On-Chip Solid-Phase Extraction and Electrochromatography" *Analytical Chemistry* 72:585-590 (2000).
Osbourn et al. "On-line preconcentration methods for capillary electrophoresis" *Electrophoresis* 21:2768-2779 (2000).
Pascali et al. "Recent advances in the application of CE to Forensic sciences, an update over years 2009-2011" *Electrophoresis* 33:117-126 (2012).
Pontillo et al. "CE-MS-based proteomics in biomarker discovery and clinical application" *Proteomics Clin. Appl.* 9:322-334 (2015).
Puig et al. "Sorbent preconcentration procedures coupled to capillary electrophoresis for environmental and biological applications" *Analytica Chimica Acta* 616:1-18 (2008).
Ramautar et al. "Developments in coupled solid-phase extraction-capillary electrophoresis 2009-2011" *Electrophoresis* 33:243-250 (2012).
Ramautar et al. "Developments in coupled solid-phase extraction-capillary electrophoresis 2011-2013" *Electrophoresis* 35:128-137 (2014).
Ramsey et al. "Generating Electrospray from Microchip Devices Using Electroosmotic Pumping" *Anal. Chem.* 69:1174-1178 (1997).
Redman et al. "Integrated Microfluidic Capillary Electrophoresis-Electrospray Ionization Devices with Online MS Detection for the Separation and Characterization of Intact Monoclonal Antibody Variants" *Anal. Chem.* 87:2264-2272 (2015).
Robledo et al. "Review of the CE-MS platform as a powerful alternative to conventional couplings in bio-omics and target-based applications" *Electrophoresis* 35:2292-2308 (2014).
Rogeberg et al. "On-line solid phase extraction-liquid chromatography, with emphasis on modern bioanalysis and miniaturized systems" *Journal of Pharmaceutical and Biomedical Analysis* 87:120-129 (2014).
Saito et al. "Instrumentation design for hydrodynamic sample injection in microchip electrophoresis: A review" *Electrophoresis* 33:2614-2623 (2012).
Smejkal et al. "Microfluidic isotachophoresis: A review" *Electrophoresis* 34:1493-1509 (2013).
Tempels et al. "On-line coupling of SPE and DE-MS for peptide analysis" *Electrophoresis* 28:1319-1326 (2007).
Timerbaev "Capillary electrophoresis of inorganic ions: An update" *Electrophoresis* 25:4008-4031 (2004).
Tomlinson "Enhanced Performance Membrane Preconcentration-Capillary Electrophoresis-Mass Spectrometry (mPC-DE-MS) in Conjunction with Transient Isotachophoresis for Analysis of Peptide Mixtures" *J. High Resol. Chromatogr.* 18:384-386 (1995).
Wang et al. "Multifunctional protein processing chip with integrated digestion, solid-phase extraction, separation and electrospray" *Electrophoresis* 31:3703-3710 (2010).
Wang et al. "Capillary Electrophoresis-Mass Spectrometry in Metabolomics: The Potential for Driving Drug Discovery and Development" *Current Drug Metabolism* 14(7):807-813 (2013).
Waters "An Overview of the Principles of $MS^E$, The Engine that Drives MS Performance" [White Paper] 8 pages (2011).
Waterval et al. "Qualitative analysis of pharmaceutically active peptides using on-capillary analyte preconcentration transient isotachophoresis" *Electrophoresis* 21:2851-2858 (2000).

(56) References Cited

OTHER PUBLICATIONS

Xue et al. "Integrated Multichannel Microchip Electrospray Ionization Mass Spectrometry: Analysis of Peptides from On-chip Tryptic Digestion of Melittin" *Rapid Communications in Mass Spectrometry* 2:1253-1256 (1997).

Xue et al. "Multichannel Microchip Electrospray Mass Spectrometry" *Anal. Chem.* 69:426-430 (1997).

Yang et al. "Membrane Preconcentration CE, A new approach to preconcentrating samples before separation" *Analytical Chemistry News & Features* 71:183A-189A (1999).

Zhang et al. "Microfabricated Devices for Capillary Electrophoresis-Electrospray Mass Spectrometry" *Anal. Chem.* 71(15):3258-3264 (1999).

* cited by examiner

PRESSURE DRIVEN FLUIDIC INJECTION FOR CHEMICAL SEPARATIONS

RELATED APPLICATIONS

This application is a continuation of U.S. patent application Ser. No. 15/570,505, filed Oct. 30, 2017, which is a 35 U.S.C. § 371 national phase application of International Application Serial No. PCT/US2016/031626, filed May 10, 2016, which claims priority to and is a continuation in part of U.S. patent application Ser. No. 14/987,326 filed Jan. 4, 2016, which is a continuation application of U.S. patent application Ser. No. 14/708,906 filed May 11, 2015, the contents of which are hereby incorporated by reference as if recited in full herein.

STATEMENT OF FEDERAL SUPPORT

This invention was made with government support under Grant No. GM066018 awarded by the National Institutes of Health and Grant No. W911NF-12-1-0539 awarded by the United States Army. The United States government has certain rights in the invention.

FIELD OF THE INVENTION

This invention is related to microfluidic sample processing that may be particularly suitable for electrospray ionization and/or sample processing systems that interface with mass spectrometers.

BACKGROUND OF THE INVENTION

Electrospray ionization ("ESI") is an important technique for the analysis of biological materials contained in solution by mass spectrometry. See, e.g., Cole, R. B. *Electrospray Ionization Mass Spectrometry: Fundamentals, Instrumentation & Applications*; John Wiley and Sons, Inc.: New York, 1997. Electrospray ionization was developed in the late 1980s and was popularized by the work of Fenn. See, e.g., Fenn J B, Mann M, Meng C K, Wong S F & Whitehouse C M (1989), *Electrospray ionization for mass-spectrometry of large biomolecules, Science* 246, 64-71. Simplistically, electrospray ionization involves the use of electric fields to disperse a sample solution into charged droplets. Through subsequent evaporation of the droplets, analyte ions contained in the droplet are either field emitted from the droplet surface or the ions are desolvated resulting in gas phase analyte ions. The source of the liquid exposed to the electric field and to be dispersed is ideally one of small areal extent as the size of the electrospray emitter directly influences the size of droplets produced. Smaller droplets desolvate more rapidly and have fewer molecules present per droplet leading to greater ionization efficiencies. These ions can be characterized by a mass analyzer to determine the mass-to-charge ratio. Further analyte structural information can be obtained by employing tandem mass spectrometry techniques.

Separation of analytes prior to electrospray ionization is important for minimizing ionization suppression and MS spectral complexity. Microfluidic capillary electrophoresis with integrated electrospray ionization has been demonstrated as a fast and efficient method of coupling a liquid phase chemical separation with mass spectroscopy detection. See, e.g., Anal. Chem. 2008, 50, 6881-6887; and Anal. Chem. 2015, 87, 2264-2272. Conventional microfluidic methods that employ electrokinetic flow of sample into the separation channel are subject to injection bias and cannot effectively be used for some on-device sample focusing methods. Further, the injection of a well-defined band of sample into the separation channel of the microfluidic device can be important to achieve an efficient separation.

SUMMARY OF EMBODIMENTS OF THE INVENTION

Embodiments of the invention provide simple, pressure-driven injection methods that can independently be applied to a plurality of different fluid reservoirs. Precise volumes of sample can be delivered into the separation and injection bias can be reduced or even eliminated.

In some embodiments, the pressure-driven injection methods can also be used with on-device sample focusing methods such as transient isotachophoresis.

The pressure-driven injection method has advantages over other microfluidic injection methods in that it can use a simple channel geometry, but it is capable of generating any desired sample plug size (i.e., volume) by simply adjusting the injection time and/or pressure. As the methods do not use voltage differentials for sample injection, they can be free of electrokinetic injection bias; furthermore, the step of applying a voltage to the sample reservoir, as occurs in some injection methods, can be omitted. The methods are suitable for performing online sample concentration methods such as transient isotachophoresis (tITP), because sample plugs with significantly different properties (electrical conductivity, pH, and/or viscosity) compared to the background electrolyte can be injected to equal extents, i.e., volumes and/or plug lengths.

Embodiments of the invention are directed to methods of sample processing. The methods include: (a) providing a microfluidic device with at least one separation channel in fluid communication with a background electrolyte (BGE) reservoir and a sample reservoir having a sample channel that merges into the separation channel; (b) injecting a fluid sample from the sample reservoir into the separation channel downstream of the BGE reservoir by concurrently applying a defined pressure to the BGE reservoir and a defined pressure to the sample reservoir; (c) then clearing a trailing end of the sample from the sample channel and flowing fluid from the BGE reservoir to deliver a plug of the sample in the separation channel in response to reducing or removing the pressure applied to the sample reservoir while applying pressure to the BGE reservoir so that pressure applied to the BGE reservoir is greater than pressure then applied to the sample reservoir; and then (d) electrophoretically separating the delivered sample in the separation channel by-applying voltage to the BGE reservoir and a downstream location of the separation channel.

The injecting, clearing and electrophoretic separation can be carried out without applying a voltage to the sample reservoir.

The electrophoretic separation can be carried out by further reducing or removing pressure applied to the BGE reservoir while applying electrokinetic voltage.

The method can also include electronically adjusting a duration of the pressure or increasing or decreasing the pressure applied to the sample reservoir and/or BGE reservoir for the injecting and/or clearing to adjust a size of the plug of the sample delivered to the separation channel.

Other embodiments are directed to methods of sample processing. The methods include: providing a microfluidic device with at least one separation channel in fluid communication with a background electrolyte (BGE) reservoir, a waste reservoir connected to the separation channel through a waste channel, and a sample reservoir connected to the separation channel through a sample channel; injecting a fluid sample from the sample reservoir into the at least one separation channel by concurrently applying pressurized gas to the BGE reservoir, the sample reservoir and optionally the waste reservoir; delivering fluid from the BGE reservoir into the at least one separation channel to define a plug of the sample in the at least one separation channel by reducing a gas pressure in the sample reservoir, so that a gas pressure in the BGE reservoir is greater than the gas pressure in the sample reservoir; electrophoretically separating an analyte component of the sample from other sample components in the at least one separation channel by generating an axial electric field within the separation channel; and performing at least one of: (a) electrospraying the separated analyte component from at least one emitter in fluid communication with the at least one separation channel; and (b) measuring an electrical signal corresponding to the separated analyte component in or emerging from the separation channel.

The injection of the fluid sample, delivery of fluid from the BGE reservoir, and electrophoretic separation of the analyte component can be carried out without applying voltage to the sample reservoir and with no electrical potential gradient in the sample channel.

During fluid delivery from the BGE reservoir, the gas pressure in the BGE reservoir is a first gas pressure, and the method can further include performing the electrophoretic separation by: reducing the gas pressure in the BGE reservoir to a second gas pressure less than the first gas pressure; and applying an electrokinetic voltage to the separation channel.

The method can include performing the electrophoretic separation by: terminating the application of pressurized gas to the BGE reservoir; an applying a voltage to the fluid in the BGE reservoir.

The method can include adjusting a time period over which the pressurized gases are applied to at least one of the sample reservoir and the BGE reservoir during the injection of the fluid sample.

The method can include controlling a time period over which the pressurized gases are applied to the BGE reservoir and a magnitude of the gas pressure within the BGE reservoir to control a volume of the sample plug in the at least one separation channel.

The method can include terminating the application of pressurized gas to the sample reservoir during delivery of fluid from the BGE reservoir into the at least one separation channel.

The method can include electrospraying the separated analyte component from the at least one emitter toward at least one of a collection device for subsequent analysis of the analyte component or an entrance inlet of a mass spectrometer.

The electrospraying can be carried out using a pump connected to the at least one separation channel through at least one pump channel to discharge the analyte component through the at least one emitter.

The gas pressures within the BGE reservoir and the sample reservoir during the injection of the fluid sample can each be between 0.1 psi and 50 psi.

The gas pressure within the sample reservoir during the injection of the fluid sample can be between 0.5 psi and 50 psi. A gas pressure within the waste reservoir during the injection of the fluid sample can be lower than the gas pressure within the sample reservoir (and may optionally be at a vacuum pressure).

The method can include reducing the gas pressure in the sample reservoir during the delivery of fluid from the BGE reservoir by venting pressurized gas from the sample reservoir.

During the injection of the fluid from the BGE reservoir, the gas pressures in the BGE reservoir and in the sample reservoir can each be between 0.5 psi and 50 psi and a gas pressure in the waste reservoir can be lower than the gas pressures in the sample and BGE reservoirs.

During the injection of the fluid from the BGE reservoir, the gas pressure in the BGE reservoir can be between 0.1 psi and 10 psi, and the application of pressurized gas to the sample reservoir and to the waste reservoir can be terminated.

During the injection of the fluid from the BGE reservoir, the gas pressures in the sample reservoir and the BGE reservoir can be maintained for a time period of between 1 second and 30 seconds.

The method can further include: providing a first pressurized gas supply tube in communication with a first pressurized gas supply, a first valve, and the BGE reservoir; providing a second pressurized gas supply tube in communication with the first pressurized gas supply or with a second pressurized gas supply, a second valve, the sample reservoir; providing a third pressurized gas supply tube in communication with a pressure reducing device, a third valve, and the waste reservoir; and opening and closing the first, second and third valves in to perform the injection of the fluid from the BGE reservoir.

The BGE reservoir can be in fluid communication with a BGE channel connected to the separation channel at a first location and the sample channel can be connected to the separation channel at a second location. The second location can be adjacent or downstream from the first location along the at least one separation channel.

The sample channel and waste channel can define a continuous flow path intersecting with, and orthogonal to, the at least one separation channel. The flow path can intersect the at least one separation channel at a location that is downstream from the BGE reservoir along the at least one separation channel.

The method can include, following the electrospraying of the separated analyte component, introducing the electrosprayed analyte component into a mass spectrometer, detecting one or more signals corresponding to the analyte component using the mass spectrometer, and generating at least one electropherogram corresponding to the analyte component.

The method can include injecting the fluid sample without introducing electrokinetic injection bias so that the electrophoretic separation of the analyte component is not affected by electrokinetic injection bias.

The plug of the sample in the at least one separation channel can include an electrolyte that has an electrophoretic mobility greater than an electrophoretic mobility of the analyte component of the sample.

The sample can include one or more of amino acids, polar metabolites, charged molecules, molecules with electrophoretic mobility, peptides, proteins, and molecules extracted from one or more of biofluids, blood, serum, urine, dried blood, cell growth media, lysed cells, environmental samples, beverages and food.

Other embodiments are directed to microfluidic analysis systems. The systems include a microfluidic device having at least one separation channel in fluid communication with a background electrolyte (BGE) reservoir, a sample reservoir connected to the at least one separation channel through a sample channel, and a waste reservoir connected to the at least one separation channel through a waste channel. The systems also include: (a) a first pressurized gas supply conduit in communication with the BGE reservoir, a first pressurized gas supply, and a first valve, and a voltage input having an electrode that extends into the BGE reservoir; (b) a second pressurized gas supply conduit in communication with the sample reservoir, the first pressurized gas supply or a second pressurized gas supply, and a second valve; (c) a third pressurized gas supply conduit in communication with the waste reservoir and a third valve; and (d) a controller in communication with a voltage source and with the first, second and third valves, and configured so that during operation of the system, the controller activates the first, second and third valves to control gas pressures in the BGE reservoir, the sample reservoir and the waste reservoir to: inject a fluid sample from the sample reservoir into the at least one separation channel; and electrophoretically separate an analyte component of the sample from other sample components in the at least one separation channel. The gas pressures in the BGE reservoir and the sample reservoir are higher than the gas pressure in the waste reservoir during the sample injection. No electrokinetic voltage is used to inject the sample into the at least one separation channel.

The controller can be configured to control the gas pressures in the BGE reservoir, the sample reservoir and the waste reservoir so that during injection of the sample, the gas pressures in the BGE reservoir and in the sample reservoir are each between 0.1 psi and 50 psi for a duration of between 1 second and 30 seconds.

The microfluidic device can include at least one pump in communication with the at least one separation channel and at least one emitter. During operation of the system, the analyte component can be discharged from the at least one emitter.

The controller can be configured so that during operation of the system: (i) gas pressures of between 0.1 psi and 50 psi are concurrently maintained in the BGE reservoir and in the sample reservoir to inject the fluid sample into the at least one separation channel; (ii) the gas pressure is reduced in the sample reservoir so that the gas pressure in the BGE reservoir is greater than the gas pressure in the sample reservoir, thereby delivering fluid from the BGE reservoir into the at least one separation channel to define a plug of the sample in the at least one separation channel; and (iii) the gas pressure is reduced in or removed from the BGE reservoir, and an electrokinetic voltage is applied to the microfluidic device to perform the electrophoretic separation.

The first and second valves can be three-way valves that can be configured to vent pressurized gas into respective first and second supply lines in response to a control signal from the controller.

The system can include an optical detector positioned so that as the analyte component flows through the at least one separation channel, the optical detector can measure radiation from the analyte component.

Still other embodiments are directed to mass spectrometer systems. The systems include: a mass spectrometer and a microfluidic device onboard or in communication with the mass spectrometer. The microfluidic device includes at least one separation channel in fluid communication with a background electrolyte (BGE) reservoir, a sample reservoir connected to the at least one separation channel through a sample channel, and optionally a waste reservoir connected to the at least one separation channel through a waste channel. The systems also include: (a) a first gas conduit in communication with a first valve and the BGE reservoir; a voltage input comprising an electrode extending into the BGE reservoir; (b) a second gas conduit in communication with a second valve and the sample reservoir; and optionally (c) a third gas conduit in communication with a third valve and the waste reservoir. The systems also include a voltage source in communication with the voltage input; at least one pressurized gas source in fluid communication with the first and second gas supply conduits; an optional pressure reducing device in fluid communication with the third gas conduit; and a controller connected to the first and second valves and optionally the third valve, and to the voltage source, and configured so that during operation of the system, the controller: (i) activates at least one of the first and second valves, and optionally the third valve, to inject a fluid sample from the sample reservoir into the at least one separation channel without applying a voltage gradient to the fluid sample; (ii) activates at least one of the first and second valves and optionally the third valve to deliver fluid from the BGE reservoir into the at least one separation channel to define a plug of the sample in the at least one separation channel; and (iii) applies an axial electric field to the sample in the at least one separation channel to electrophoretically separate an analyte component from other components of the sample in the at least one separation channel.

The controller can be configured to inject the fluid sample by maintaining the BGE reservoir at a first gas pressure, maintaining the sample reservoir at a second gas pressure, and maintaining the waste reservoir at a third gas pressure smaller than the first and second gas pressures, for a first time interval.

The controller can be configured to deliver the fluid from the BGE reservoir by maintaining the BGE reservoir at the first gas pressure, and the sample reservoir at a fourth gas pressure smaller than the first gas pressure, for a second time interval.

The controller can be configured to reduce the gas pressure in the BGE reservoir by venting pressurized gas from the BGE reservoir before or during the electrophoretic separation.

The first and second valves can be three-way valves configured to vent pressurized gas from the BGE and sample reservoirs respectively. The controller can be configured control gas pressures in the BGE and sample reservoirs by venting pressurized gas from the reservoirs within 0.1-3 seconds by activating the first and second valves.

The system can include at least one electrospray ionization emitter and at least one pump in communication with the at least one electrospray ionization emitter and the controller. During operation of the system, the controller can be configured to operate the pump to electrospray the separated analyte component from the at least one separation channel through the at least one electrospray ionization emitter.

During operation of the system, the controller can be configured to adjust a duration of at least one of the first and second time periods to control a volume of the sample plug.

The first and second gas pressures can each be between 0.1 psi and 50 psi.

The eletrophoretic separation can be carried out by removing pressure applied to the BGE reservoir while applying (electrokinetic) voltage to the BGE reservoir.

The systems and methods can electronically adjusting a duration of the pressure applied to the sample reservoir and/or BGE reservoir for the injecting step.

The systems and methods can include controlling a duration and magnitude of the pressure applied to the BGE reservoir to adjust a size of the plug of the sample delivered to the separation channel.

The clearing the trailing end of the sample to deliver the plug of the sample into the separation channel can be carried out by removing the pressure applied to the sample reservoir while applying the pressure to the BGE reservoir.

The pressure applied to the sample reservoir during the injecting step can be between 1 and 10 psi. The reducing or removing the pressure applied to the sample reservoir during the clearing step can be carried out by venting the pressurized gas in the sample reservoir headspace gas (typically to atmosphere, but other venting arrangements may be used).

Yet other embodiments are directed to microfluidic analysis systems that include a microfluidic device comprising at least one separation channel in fluid communication with a background electrolyte (BGE) reservoir, and a sample reservoir having a sample channel that merges into the separation channel and a sample waste channel that merges into the separation channel. The systems also include a first pressure supply tube in communication with a pressurized gas supply and a first valve, the tube having a voltage input attached to the BGE reservoir. The systems also include a second pressure supply tube in communication with a pressurized gas supply and a second valve attached to the sample reservoir. The systems also include a controller in communication with a voltage source (typically for a high voltage input), and the first and second valves (and optionally at least one pressurized gas supply for the first/second supply tubes) configured to direct the first and second valves to open and close to carry out a respective sample injection into the at least one separation channel, then the electrophoretic separation. Sample injection can be carried out using only pressure applied to the BGE reservoir and sample reservoir from the first and second supply tubes without any electrokinetic voltage.

The controller can be configured to have a defined timing sequence for applying pressures between 0.1 and 50 psi to a headspace of the BGE reservoir via the first supply tube and to a headspace of the sample reservoir via the second supply tube for defined durations between 1 and 30 seconds to inject a respective sample into the at least one separation channel.

The controller can be configured to independently apply a defined pressure to the sample reservoir and a defined pressure to the BGE reservoir. The microfluidic device can include at least one pump channel (for example, but not limited to, an EO pump channel) in communication with the separation channel and/or at least one emitter for causing the separated sample to electrospray out of the at least one emitter toward a collection device for subsequent analysis and/or toward an entrance of a mass spectrometer.

The controller can be configured to concurrently supply pressure that is between 0.1 psi and 50 psi to the BGE reservoir and the sample reservoir, then reduce or remove the pressure applied to the sample reservoir while applying pressure to the BGE reservoir so that pressure applied to the BGE reservoir is greater than any pressure then applied to the sample reservoir to clear a trailing end of the sample from the sample channel and flow fluid from the BGE reservoir to thereby deliver a plug of the sample in the separation channel in response. The controller can be configured to then further reduce or removes pressure applied to the BGE reservoir while applying a voltage to the BGE reservoir and a downstream location of the separation channel for the electrophoretic separation, all without applying any voltage to the sample reservoir.

The first and second valves can be three-way valves that can vent pressurized gas in respective first and second supply lines in response to a control signal from the controller.

Yet other embodiments are directed to mass spectrometer analyzer systems with a mass spectrometer with an entrance and a microfluidic device onboard or in communication with the mass spectrometer. The microfluidic device includes at least one separation channel in fluid communication with a background electrolyte (BGE) reservoir, a sample reservoir having a sample channel that merges into the separation channel and a sample waste channel that merges into the separation channel. The systems further include a first pressure supply tube attached to the BGE reservoir and in communication with a pressurized gas supply and a first valve. The systems also include a voltage input attached to the BGE reservoir and a second pressure supply tube in communication with a pressurized gas supply and a second valve attached to the sample reservoir. The systems also include at least one power source in communication with the BGE reservoir for providing the voltage input and at least one pressure source in fluid communication with the first and second pressure supply tubes. The systems also include at least one controller configured to control the at least one power source for application of an electric field to the microfluidic device and to control pressures supplied to respective headspaces of the sample reservoir and BGE reservoir. Loading of samples into the separation channel can be performed using pressure without any voltage applied to the BGE reservoir and sample reservoir of the microfluidic device.

The first and second valves can be three-way valves that can controllably vent respective headspace pressure.

It is noted that aspects of the invention described with respect to one embodiment, may be incorporated in a different embodiment although not specifically described relative thereto. That is, all embodiments and/or features of any embodiment can generally be combined in any way and/or combination as appropriate, unless stated otherwise. Applicant reserves the right to change any originally filed claim and/or file any new claim accordingly, including the right to be able to amend any originally filed claim to depend from and/or incorporate any feature of any other claim or claims although not originally claimed in that manner. These and other aspects are explained in detail in the specification set forth below. Further features, advantages and details will be appreciated by those of ordinary skill in the art from a reading of the figures and the detailed description of the embodiments that follow, such description being merely illustrative of the disclosure.

BRIEF DESCRIPTION OF THE DRAWINGS

FIG. 12A (the top electropherogram) was obtained using an electrokinetically gated injection of the mixture. FIG. 12B (the bottom electropherogram) was obtained from pressure driven injection of the mixture with a loading time of 3 seconds at 2 psi.

FIG. 14A (the top electropherogram) was obtained using an electrokinetically gated injection of the mixture. FIG. 14B (the bottom electropherogram) was obtained from a pressure driven injection of the mixture with a loading time of 3 seconds at 2 psi.

FIG. 15A (on the left) shows the effect of increased sample loading when the leading electrolyte concentration is too low to support tITP, with no salt added to the BGE. The electropherograms in FIG. 15B (on the right) show that tITP leads to sharp peaks of increasing concentration when larger amounts of a sample containing a sufficient concentration of leading electrolyte are loaded. This sample contained 100 mM sodium chloride.

FIG. 16A (the top electropherogram) was obtained for a sample injected with 100 mM sodium chloride. FIG. 16B (the bottom electropherogram) was obtained for a sample injected with 100 mM ammonium acetate. Both samples were injected for 10 seconds at 2 psi.

Figure 1A:
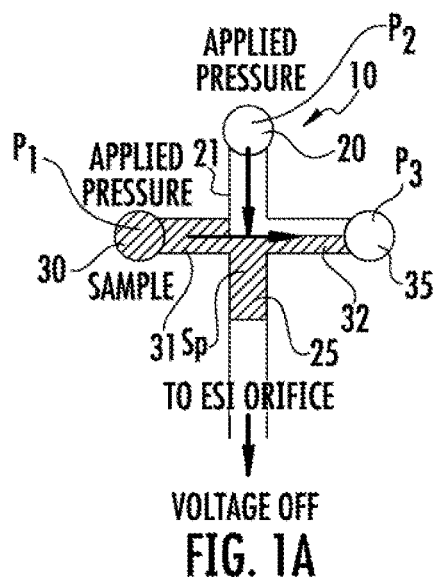
FIGS. 1A-1C are schematic illustrations of a sequence of actions used to inject sample into a separation channel of a microfluidic device.

The present invention will now be described more fully hereinafter with reference to the accompanying figures, in which various embodiments are shown. This disclosure may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise. The abbreviations "FIG. and "Fig.") for the word "Figure" can be used interchangeably in the text and figures.

DETAILED DESCRIPTION

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. Well-known functions or constructions may not be described in detail for brevity and/or clarity.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The term "about" means that the stated number can vary from that value by +/−20%.

The term "analyte" refers to a molecule or substance undergoing analysis, typically, at least for mass spectrometry analysis, having an ion or ions of interest in a mass-to-charge (m/z) range of interest. The analyte can comprise biomolecules such as polymers, peptides, proteins and the like. Embodiments of the invention are particularly suitable for analyzing intact monoclonal antibodies. Embodiments of the invention are particularly suitable for analyzing metabolites.

The term "separated sample" refers to the electrophoretically separated components of a sample mixture (i.e., spatially separated along the axial extent of the separation channel) and may or not be separated into individual components. Components will be separated based upon their effective electrophoretic mobilities and separation of components will depend on the difference in effective mobilities. The separated sample can be detected by observing the spatial separation in the separation channel or by observing the arrival times of the components at the electrospray emitter or detector. Effective electrophoretic mobility is defined as the observed velocity in the separation channel divided by the electric field strength in the separations channel and includes the actual electrophoretic mobility and the vector sum of any other effect imparting velocity to the component including but not limited to electroosmotic or pressure driven transport. The "sample" can include a collection of one or more different components (i.e., an analyte and surrounding matrix material). The sample is introduced into the fluidic device. During separation, an "analyte component" of the sample can be separated for analysis, apart from other components.

The term "microfluidic chip" refers to a substantially planar, thin, and, in some embodiments, rigid device. The term "thin" refers to a thickness dimension that is less than about 10 mm, typically about 1 mm or less. The microchip typically has a width and length that is less than about 6 inches and a thickness that is less than about 5 mm, typically between about 2000 µm to about 250 µm.

The term "pre-concentration" refers to one or more steps that are performed to increase a local concentration of an analyte relative to a concentration at introduction to a fluidic analysis device or system so that a sample with the analytes is processed, typically prior to introduction into a separation channel, to contain analytes at higher concentrations relative to concentration(s) when introduced to the system, device, or process, i.e., as introduced to a sample channel or reservoir upstream of the separation channel. The term "pre-concentrating" refers to processes, typically on-chip processes, that achieve the pre-concentration. Where electrokinetic techniques are used, the pre-concentrating can be referred to as "focusing."

The terms "integrated" and "integral" and variations thereof means that the component or process is incorporated into or carried out by a fluidic device.

The term "high voltage" refers to voltage in the kV range, i.e., at least 1 kV, typically between about 1-100 kV, more typically between about 1-20 kV. ESI processes can employ potentials of a few kVs, typically between about 1 kV to about 5 kV, for example. Although other voltages may be appropriate.

The term "microfluidic" refers to fluid flow channels that have sub-millimeter or smaller width and/or depth (e.g., the term includes nanometer size channels) and includes channels with width or depth in a size range of about tens to hundreds of microns.

As used herein, the "width" of a respective channel, such as channel 31, is measured in the plane of device 10 (i.e., in the plane defined by the microfluidic chip) and in a direction that is perpendicular to an axis of the channel along which fluid flow occurs through a respective channel in a direction parallel to the axis. As used herein, the "depth" of a channel is measured in a direction perpendicular to the plane of device 10 and to the direction along which the width is measured.

The term "defined" when used with a numerical value of an input such as voltage, time or pressure refers to user or system adjustable values as well as preset, "hard-coded" or programmed values.

All of the document references (patents, patent applications and articles) are hereby incorporated by reference as if recited in full herein.

In typical free zone capillary electrophoresis (CE) experiments, a sample plug is injected into a column, and an applied electric field causes sample components to separate according to differences in their mobilities. The mobility of a molecule is the sum of its electrophoretic mobility and the electroosmotic mobility, and any pressure driven flow, if present, of the separation column. The term "plug" with respect to "sample" refers to a quantity of a sample collected/localized within a spatial region, such as within a spatial region of a carrier fluid. The plug can be a physical band or segment with defined leading and trailing ends so that there is a distinct clearance between successive plugs or bands.

The analyte in a sample can be any analyte of interest including, for example, various mixtures including synthetic and biological macromolecules, nanoparticles, small molecules, DNA, nucleic acids/polynucleic acids, peptides, proteins and the like. The sample can include one or more polar metabolites such as amino acids or charged molecules, molecules, peptides, and proteins. The sample may also or alternatively include molecules extracted from biofluids, blood, serum, urine, dried blood, cell growth media, lysed cells, beverages or food; or environmental samples such as water or soil.

Figure 2A:
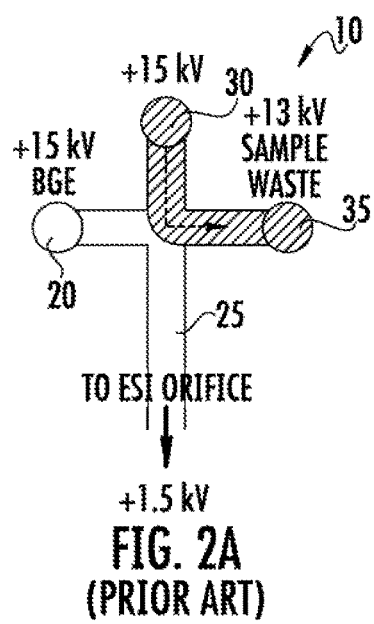
FIGS. 2A-2C are schematic illustrations of the same microfluidic device shown in FIGS. 1A-1C, but illustrating prior art electrokinetic injection of a sample.
Figure 2B:
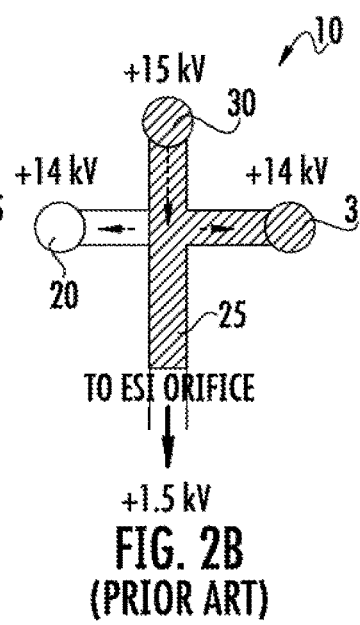
Figure 2C:
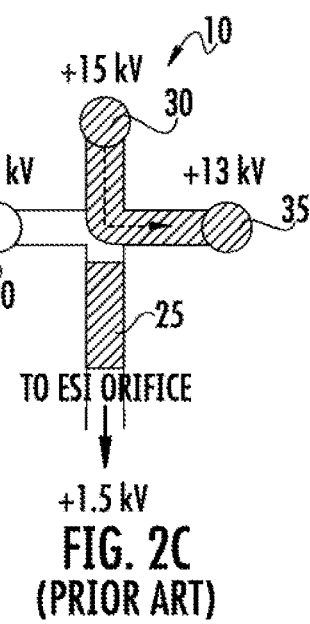

As shown in FIGS. 2A-2C, electrokinetic (EK) gate methods—which use a sequence of different voltages applied to a microfluidic device 10—have been used for sample injection.

Generally stated, in the systems and methods disclosed herein, differential pressure is used to inject samples into a microfluidic device 10 for microchip capillary electrophoresis (CE). The pressure-drive method has advantages over other microfluidic injection methods such as voltage-driven loading methods, in that it can use a simple channel geometry, but is capable of generating desired sample plug (Sp) sizes by simply adjusting the injection time and/or pressure applied to the reservoirs 20, 30.

The methods can also typically be free of eletrokinetic injection bias and no voltage is required to be applied to the sample reservoir 30.

Electrophoretic separation of the analyte component from the sample once loaded can include reducing the pressure applied to the sealed headspace of the BGE reservoir and applying an electrical potential difference between a first position in the BGE reservoir and a second position downstream from the first position, when the sample is in the separation channel.

The sample can be introduced into the separation channel 25 without applying an electrokinetic voltage and/or voltage gradient across the sample channel 31.

The sample can be flowed through the sample channel 31 without applying a voltage to the sample reservoir 30, to the BGE reservoir 20, or to the waste reservoir 35 and/or with no electric potential gradient in any of the sample channel 31, the BGE channel 21 and the waste channel 32.

The pressure-driven injection methods disclosed herein can be particularly suitable for performing online sample concentration methods such as transient isotachophoresis (tITP), because sample plugs Sp with significantly different properties (electrical conductivity, pH, or viscosity) compared to the background electrolyte can be injected. Salt or other electrolyte material in the sample/sample reservoir 30 can be used for tITP. Pressure-driven operation can be used to position a well-defined band of sample (sample plug Sp) into the separation channel 25 of the microfluidic device using only pressure-driven flow and can also be used for online sample focusing methods that are not possible by other microfluidic injection methods.

Figure 1B:
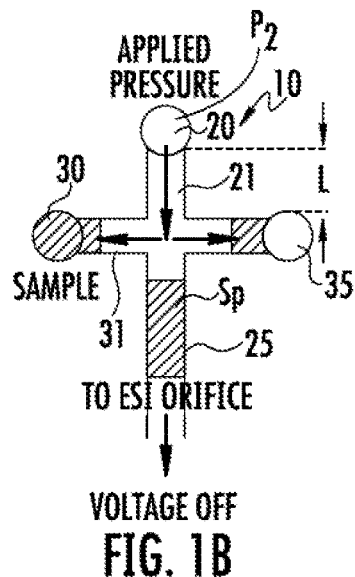
Figure 1C:
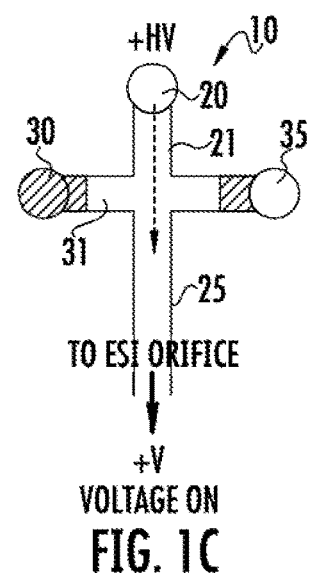

FIGS. 1A and 1B illustrate pressure-driven injection of a sample into a microfluidic device while FIGS. 2A and 2B illustrate voltage driven/gated methods of injection by way of comparison. FIGS. 1C and 2C illustrate, respectively, subsequent transport/separation in a transport channel 25 of the microfluidic device. The noted voltages (and polarity) in FIGS. 2A-2C are also by way of example.

Figure 7A:
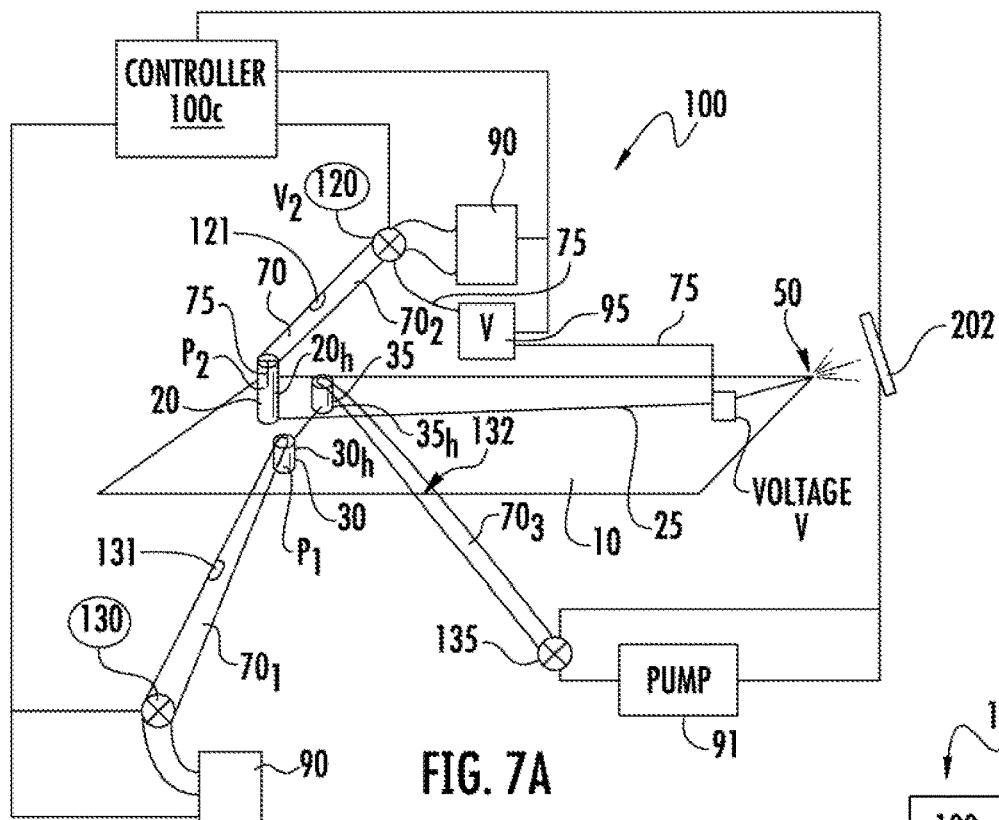
FIG. 7A is a schematic illustration of a microfluidic system.
Figure 7B:
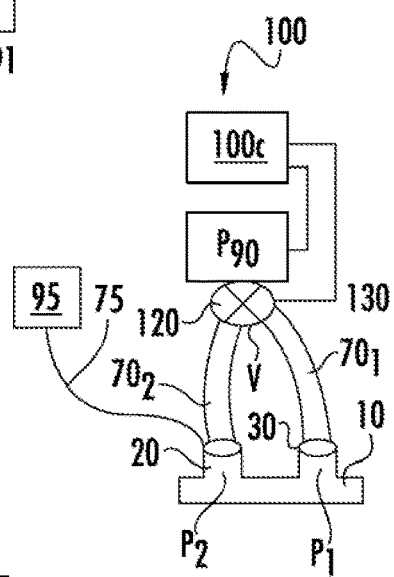
FIG. 7B is a schematic illustration of another embodiment of a microfluidic system.

Referring to FIGS. 1A, 1B and 1C, head pressure can be applied to at least two different fluid reservoirs 20, 30 on or in communication with microfluidic device 10, typically using off-device (e.g., off-chip) on/off valves 120, 130 (FIGS. 7A, 7B). The term "head pressure" refers to the gas pressure in a sealed headspace of the reservoir above the liquid. The head pressure of the BGE reservoir 20 is labeled P2 and the head pressure of the sample reservoir 30 is labeled P1. Where pressure is applied to the waste reservoir, the head pressure of the waste reservoir 35 is identified as P3 (FIG. 1A) and this can be applied via a pressure reducing device 91 such as a pump and/or vacuum. A controller 100c (FIGS. 7A, 7B) can be in communication with the valves 120, 130 to independently control when the pressures P1, P2 are applied to respective reservoirs 20, 30. Thus, for sample loading, no voltage is applied to either the BGE reservoir 20 or the sample reservoir 30 (FIGS. 1A, 1B, for example).

The microfluidic channels 25, 31, 32 within the device 10 can, in some embodiments, be configured to form a simple injection cross.

The background electrolyte (BGE) reservoir 20 can reside at the top of the injection cross above the separation channel 25. Alternatively, the BGE reservoir 20 can reside directly adjacent the separation channel or may have a BGE flow channel 21 that merges into the separation channel 25 to position the BGE reservoir 20 a distance away from the sample channel 31 and the sample waste channel 32 that can extend to a waste reservoir 35.

Figure 6A:
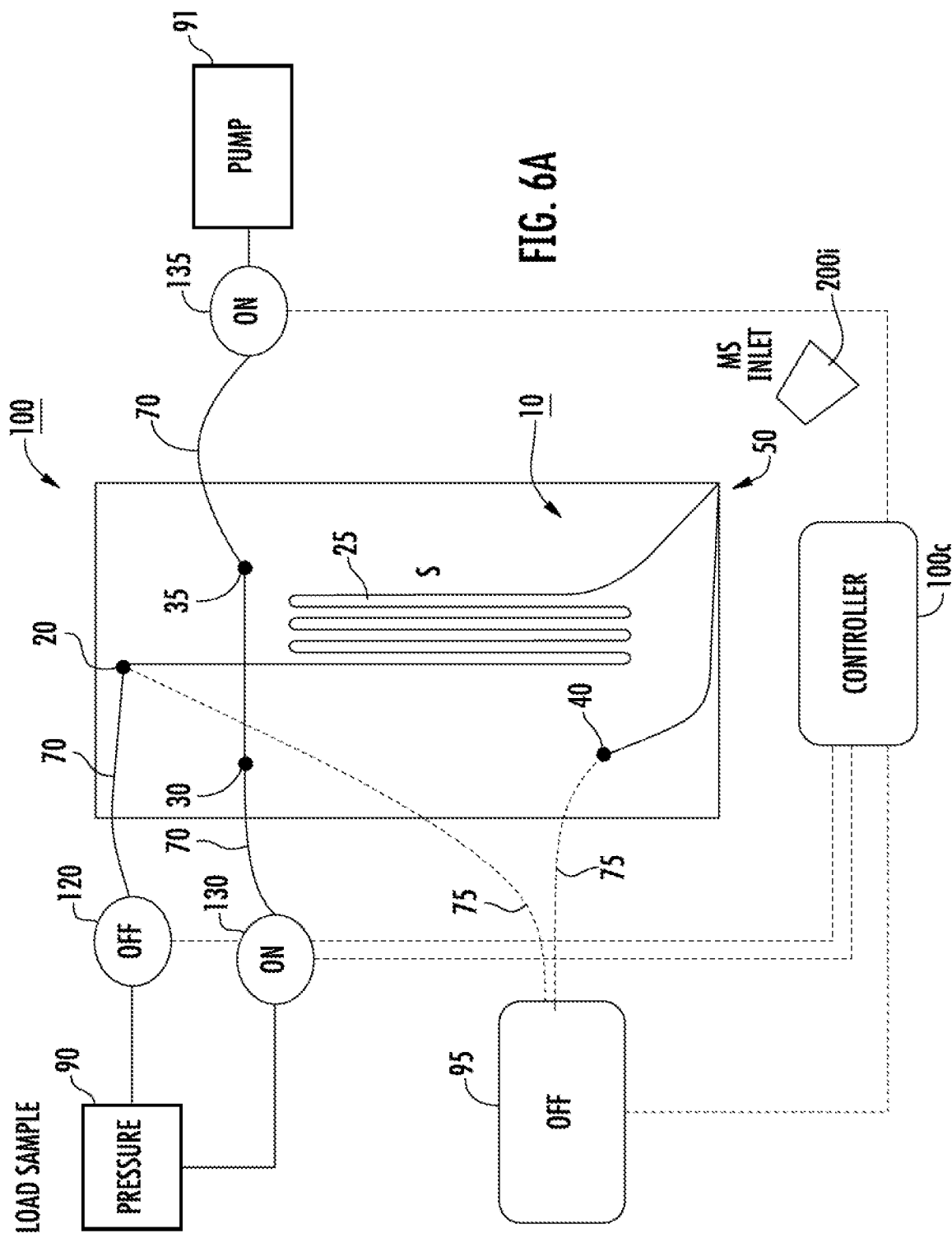
FIGS. 6A-6C are schematic illustrations of embodiments of microfluidic devices, showing various stages of injecting and separating samples.
Figure 6B:
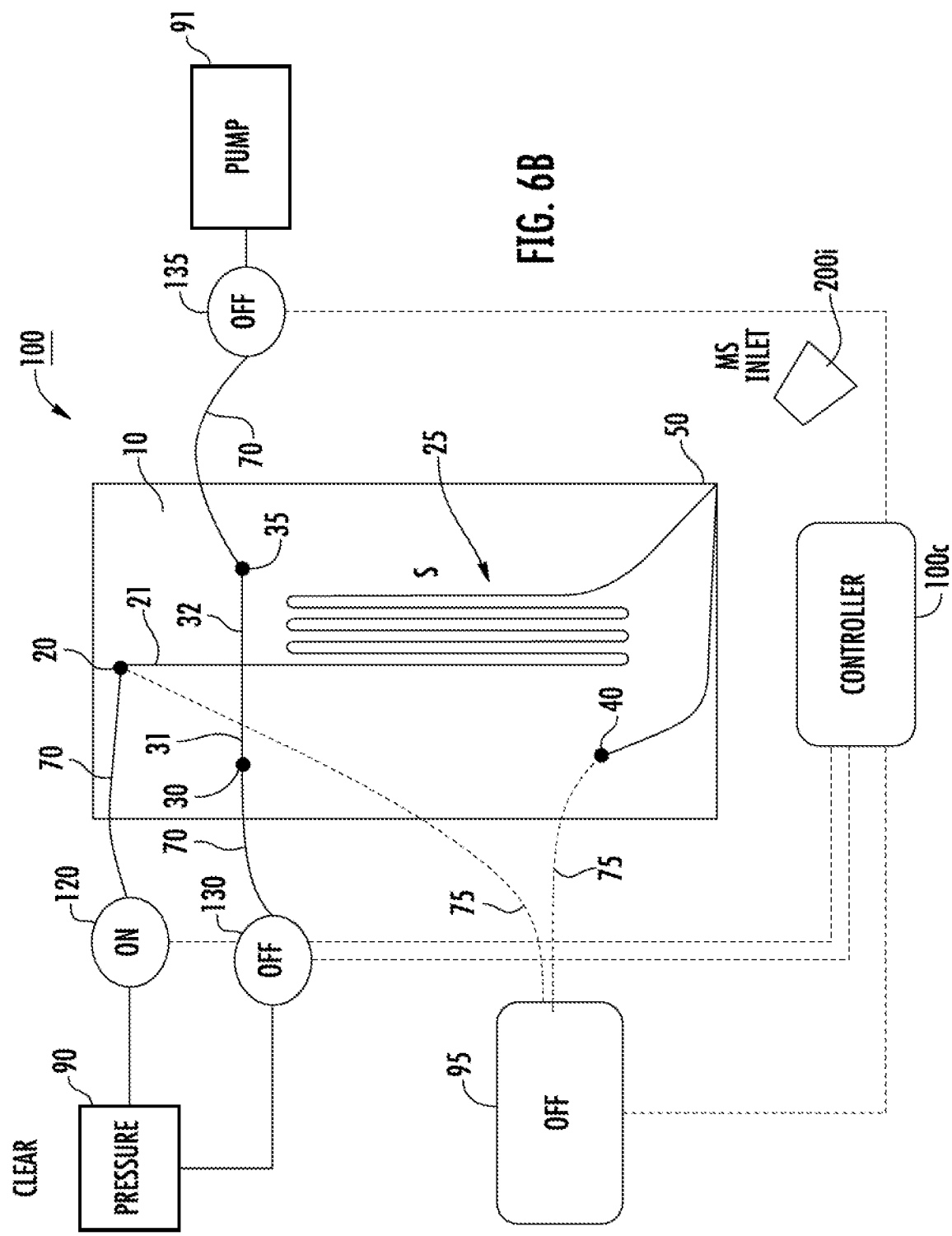
Figure 6C:
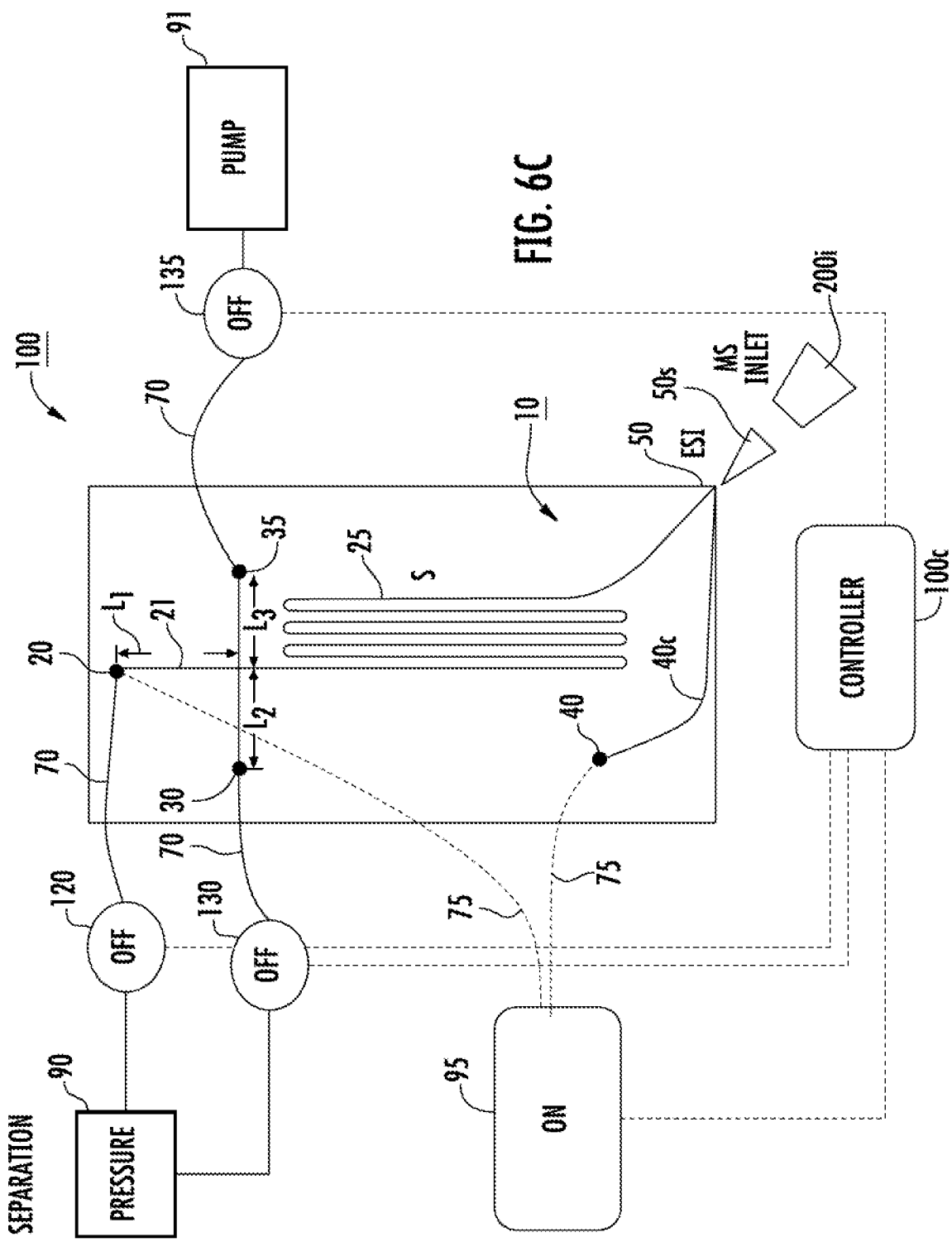
Figure 6D:
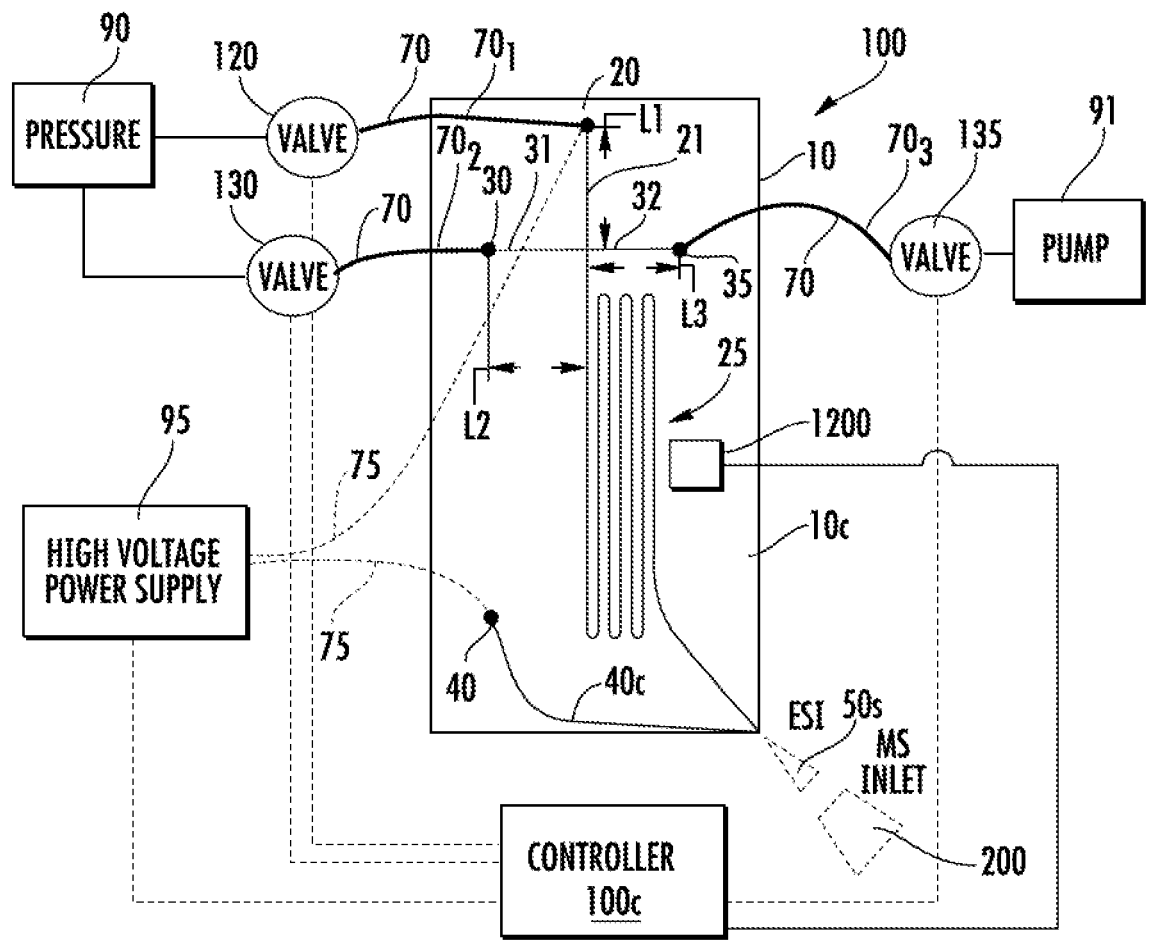
FIG. 6D is a schematic illustration of a microfluidic device similar to FIG. 6A and including a detector.

Referring to FIGS. 6C and 6D, the BGE channel 21 can have a length "$L_1$" extending from the BGE reservoir 20 to the sample channel 31 and/or to the intersection of sample channel 31 and waste channel 32 with separation channel 25. The length "$L_1$" can be any suitable length such as between 1-200 mm long. The length "$L_2$" of the sample channel 31 extends from the sample reservoir 30 to the separation channel 25. The length "$L_3$" of the waste channel 32 extends from the waste reservoir 35 to the separation channel 25. Also, the length $L_1$, $L_2$, $L_3$ of one or more of the channels 21, 31, 32, can be any suitable length such as about 1 mm, about 5 mm, about 10 mm, about 20 mm, about 30 mm, about 40 mm, about 50 mm, about 60 mm, about 70 mm, about 80 mm, about 90 mm, or about 100 mm, in some embodiments, but other lengths can be used. Where used, the injection cross configuration may be such that channels 21, 31 and 32 have substantially the same length or different lengths, but typically lengths that are much less than the length of the separation channel 25. The sample and sample waste channels 31, 32, can be longer or shorter than the BGE channel 21 and may, for example, be between 1-20 mm long. In some embodiments, the sample and sample waste channels 31, 32 are about 8 mm in length, for example. The separation channel 25 can have any suitable length, typically between 1 cm to 100 cm, more typically between about 20-30 cm, such as about 23 cm.

The fluidic (sample) channel 31 can have a width and/or depth that is between 40 nm and 1000 µm, more typically between about 1 µm and about 100 µm, such as a channel depth and width of about 10 µm (depth) and 70 µm (width), respectively. The fluidic channels 21, 31 and 32 can all have the same depth or may have different depths. The fluidic channels 21, 31 and 32 can have the same width or different widths.

In the embodiments shown in FIGS. 1A, 1B and 1C, sample channel 31 and the waste channel 32 are positioned on opposite sides of the separation channel 25, and may optionally be orthogonal to and extend across to intersect the separation channel 25. The BGE reservoir 20 can be positioned at the top of the separation channel 25, and connected to separation channel 25 directly, or through BGE channel 21. In some embodiments, channels 31, 32 can be positioned so that they are offset from each other on opposite sides of separation channel 25.

In some embodiments, the microfluidic devices do not include a waste channel 32. Thus, a "tee" intersection of the sample channel 31 (in lieu of the cross channel configuration) to the separation channel 25 may be used and may be implemented using a relatively precise pressure on the BGE reservoir 20 to hold that fluid stationary for injection/sample loading.

Referring to FIG. 1A, pressure is initially concurrently applied to the sample reservoir 30 (P1) and the BGE reservoir 20 (P2) to drive sample from the sample reservoir 30 (shown by the hatched region and the directional arrows) into the separation channel 25 from the sample channel 31, and typically the waste channel 32, but not the BGE channel 21. When a plug of a sample Sp in the separation channel 25 reaches a desired length (typically downstream of both the BGE reservoir 20 and the sample reservoir 30), as shown in FIG. 1B, pressure P1 is decreased in sample reservoir 30, but pressure P2 is maintained in BGE reservoir 20. As shown by the arrows, BGE which flows from the BGE channel 21 clears sample in the sample and waste channels 31 and 32, leaving a defined plug of sample Sp (trailing end is separated from any adjacent sample in the channels 31, 32) in the separation channel 25. This pressure drive/injection is carried out without applying a voltage to the sample reservoir 30. At this point, as shown in FIG. 1C, the pressure P2 is reduced in BGE reservoir 20, and a voltage is applied to sample plug Sp between the BGE reservoir 20 and the separation channel 25 at a downstream location, typically at an end portion or terminus of the separation channel 25, to perform an electrophoretic separation.

The voltage applied to the BGE reservoir 20 can be a high voltage HV as shown, although lower voltages may be used in some embodiments. The voltage V applied downstream can be a lower voltage than the voltage applied to the BGE reservoir 20. The lower voltage V can be between 10%-50% of the BGE reservoir voltage. Applied voltages can vary according to the sample that is analyzed and other conditions of the analytical method. For example, HV typically ranges from about +1 kV to +30 kV, and V typically ranges from 0 to +4 kV. But, the applied voltages and polarity can vary for different applications. For example, the polarity of the separation could be reversed so that the high voltage input shown in FIG. 1C is negative, or closer to zero (0) and the opposing voltage (shown in FIG. 1C as the "low voltage" input) could be higher or even negative depending on the relative length of the microfluidic channels, the charge of the analytes, and the polarity of the ESI process.

The pressures applied to the headspaces of the reservoirs, i.e., reservoirs 20, 30 can be low pressures, such as between 0.1 psi and 50 psi, typically between 0.5 and 30 psi, and more typically between about 1 psi and about 12 psi, such as about 0.5 psi, about 1 psi, about 1.5 psi, about 2 psi, about 2.5 psi, about 3 psi, about 3.5 psi, about 4 psi, about 4.5 psi, about 5 psi, about 5.5 psi, about 6 psi, about 6.5 psi, about 7 psi, about 8 psi, about 8.5 psi, about 9 psi, about 9.5 psi, about 10 psi, about 10.5 psi, about 11 psi, about 11.5 psi and about 12 psi. It should be understood that above and elsewhere in this disclosure, exemplary pressure values (e.g., 0.1-50 psi) in the headspaces of reservoirs are relative to atmospheric pressure, not absolute pressures, unless expressly noted otherwise. It should also be understood that "reducing" pressure can include removing the applied pressure altogether, so that the headspace pressure in a reservoir is equal to atmospheric pressure. Using devices such as pumps, headspace pressures in a reservoir can also be reduced to values less than atmospheric pressure.

The pressures can be controlled through respective gas supply lines 70 sealably attached to respective reservoirs 20, 30, typically conduits or lengths of tubing from at least one pressurized gas source 90 (FIGS. 7A, 7B, 9A, 9B). The pressurized gas for implementing pressure-driven injection can include air, noble gases such as helium or nitrogen, and/or other inert gases.

As shown in FIG. 7A, a pressurized gas supply line $70_3$ can also be attached to the waste reservoir 35. The pressurized gas supply line $70_3$ can also be in fluid communication with a valve 135 and a pressure reducing device 91, typically a pump and/or vacuum as discussed further below.

In FIG. 7A, discrete valves 120, 130, 135 are connected to pressurized gas supply lines $70_2$, $70_1$, $70_3$, respectively. In some embodiments, any or all of valves 120, 130, 135 are three-way valves.

In some embodiments, the pressure applied concurrently to the BGE reservoir 20 and the sample reservoir 30 for the injection (FIG. 1A) is between 0.5 psi and 50 psi, typically between about 0.5 psi and about 30 psi, more typically between about 1 and 12 psi, for between 1-5 seconds. Then, to clear the tail end of the sample (FIG. 1B) from the sample channel 31, the pressure in the BGE reservoir 20 can be held the same or reduced by 10-80%, such as to a pressure of between about 0.1 psi and about 10 psi, and the pressure in the sample reservoir 30 can be reduced more than the reduction in the pressure of the BGE reservoir 20, e.g., typically so that it is less than 0.1 psi, e.g., zero or at ambient or atmospheric pressure or below ambient or atmospheric pressure (e.g., partially evacuated). Where a reduced pressure is applied to the sample reservoir 35, it can be removed during the clearing.

The clearing pressure on the BGE reservoir 20 can be held for a time that is less than the injection time where pressure is applied to both reservoirs 20, 30. The clearing pressure time for the pressure applied only to the BGE reservoir 20 can be 2 seconds or less, 1 second or less or 0.5 seconds, for example.

FIGS. 6A-6C illustrate an exemplary sequence of operation of the valves 120, 130, 135 for injection (which can also be referred to interchangeably as "sample loading") and clearing according to some particular embodiments of the present invention.

As shown, the system 100 can include a pressure reducing device 91 such as a pump in communication with a waste reservoir 35 which may also be connected via a respective valve 135. The pressure-reducing device 91 can have an active or passive configuration, i.e., can comprise a vacuum, a pump, an evacuated reservoir, or any other enclosed volume at a pressure less than the pressure applied to the BGE reservoir 20 and/or sample reservoir 30, typically less than ambient pressure, that will reduce the pressure in the headspace of the waste reservoir 35 once connected.

FIG. 6D illustrates that in some embodiments, the analysis system 100 can include the fluidic device 10 and may also include at least one detector 1200 to obtain signal from the sample in the separation channel 25. The fluidic device 10 may be configured without the at least one ESI emitter 50 and may be used without directing the input to the mass spectrometer 200. The detector 1200 can be an electronic detector such as an optical detector and/or a conductance detector (i.e., comprising an ammeter), for example. Where used, the optical detector 1200 can include a photodiode or photomultiplier tube. Other detectors that can be used include, but are not limited to, CCD detectors and CMOS detectors, and any combination of the above. Light sources that can be used with detector 1200 include, but are not limited to, lasers, LED sources, fluorescent lamps, flashlamps, metal-halide lamps, incandescent sources, discharge sources, and blackbody radiation sources.

In general, detector 1200 obtains signals from a sample in the separation channel 25. In some embodiments, the analysis system 100 can include both the at least one detector 1200 and the at least one ESI emitter 50 for input to the inlet/entrance aperture of the mass spectrometer 200. In some embodiments, both mass spectrometer detection and optical detection by the detector 1200 can be carried out simultaneously, i.e., signal from a sample discharging from the ESI emitter 50 into the inlet of the mass spectrometer 200 can be obtained while signal from the detector 1200 is obtained for the same sample.

In some embodiments, each of the sample reservoir 30, the BGE reservoir 20, and the waste reservoir 35 can be maintained at a common electrical potential as the sample is flowed through the sample channel using only pressure-driven operation so as to not apply an electrokinetic voltage, since these reservoirs are at the same electrical potential in the absence of an external field. Thus, no electrokinetic voltage drive is used (for either a common potential or a zero potential configuration). In contrast, conventionally, an electrokinetic voltage gradient is used to drive the injection.

As noted above, transient isotachophoresis (tITP) has been previously described as an online sample focusing method for capillary electrophoresis. This technique is particularly useful for samples that include a relatively large concentration of an electrolyte (termed the leading electrolyte) that has higher electrophoretic mobility than analyte ions in the sample. As is well known, the leading electrolyte is typically added to the sample solution prior to performing tITP. The leading electrolyte concentration is typically significantly greater (such as at least 5× or 10× greater) than the electrolyte concentration in the background electrolyte to provide a sufficient minimum conductivity difference between the background electrolyte and the leading electrolyte. Suitable conditions for implementing tITP can be realized, for exampling, by injecting samples with high concentrations of sodium chloride or other electrolytes. For example, for a pH 2.2 background electrolyte (with a hydronium ion concentration of approximately 6 mM), a 15 mM leading electrolyte concentration is too low, but concentrations at or above 50 mM are sufficient for tITP to be realized.

To take advantage of the sample focusing effects of tITP, a larger band of the sample can be injected, relative to other sample processing/analysis methods. Typically, a relatively large concentration of the leading electrolyte is introduced into the sample prior to injection. In general, the pressure-driven injection methods disclosed herein allow extensive control over the size of the injected sample band, simply by changing the head pressure(s) and/or the duration of the applied pressure during the sample loading step. To introduce the leading electrolyte, the BGE reservoir 20 can include liquid electrolyte comprising sodium or salt in sufficient amount for tITP.

Figure 3:
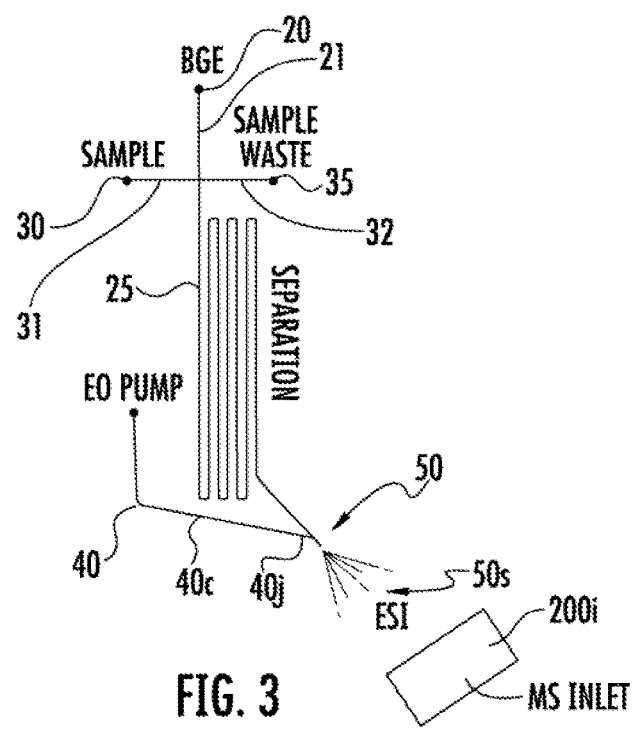
FIG. 3 is a schematic illustration of an embodiment of a microfluidic device that can be used with pressure-driven injection.
Figure 9A:
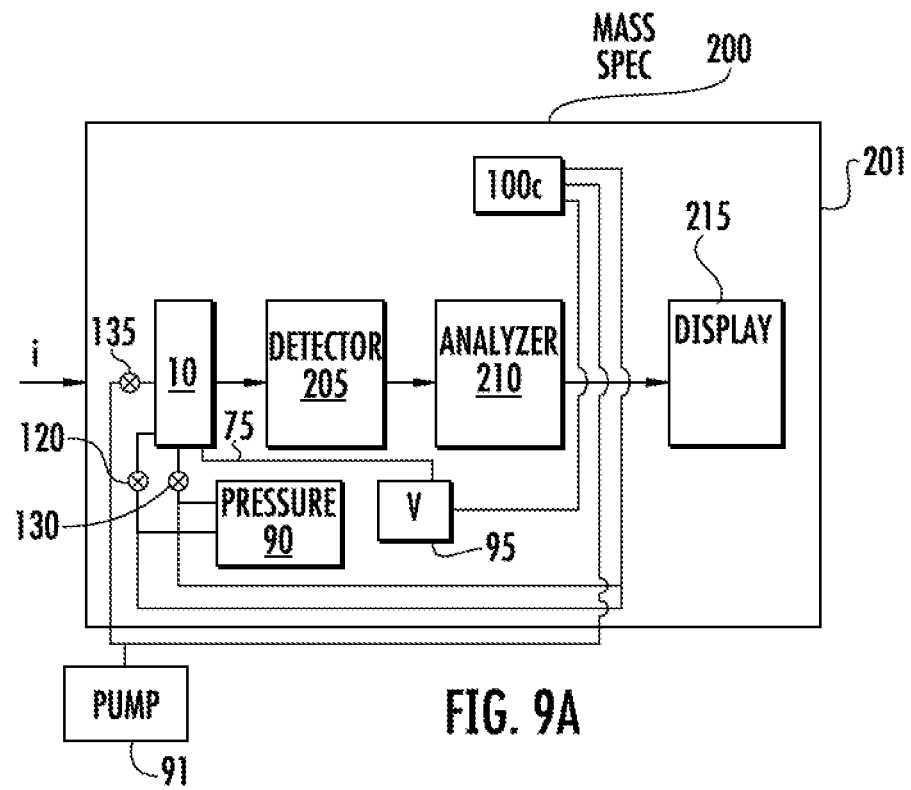
FIG. 9A is a schematic illustration of a portable mass spectrometry (MS) device with an onboard microfluidic system that implements pressure-driven injection of samples.
Figure 9B:
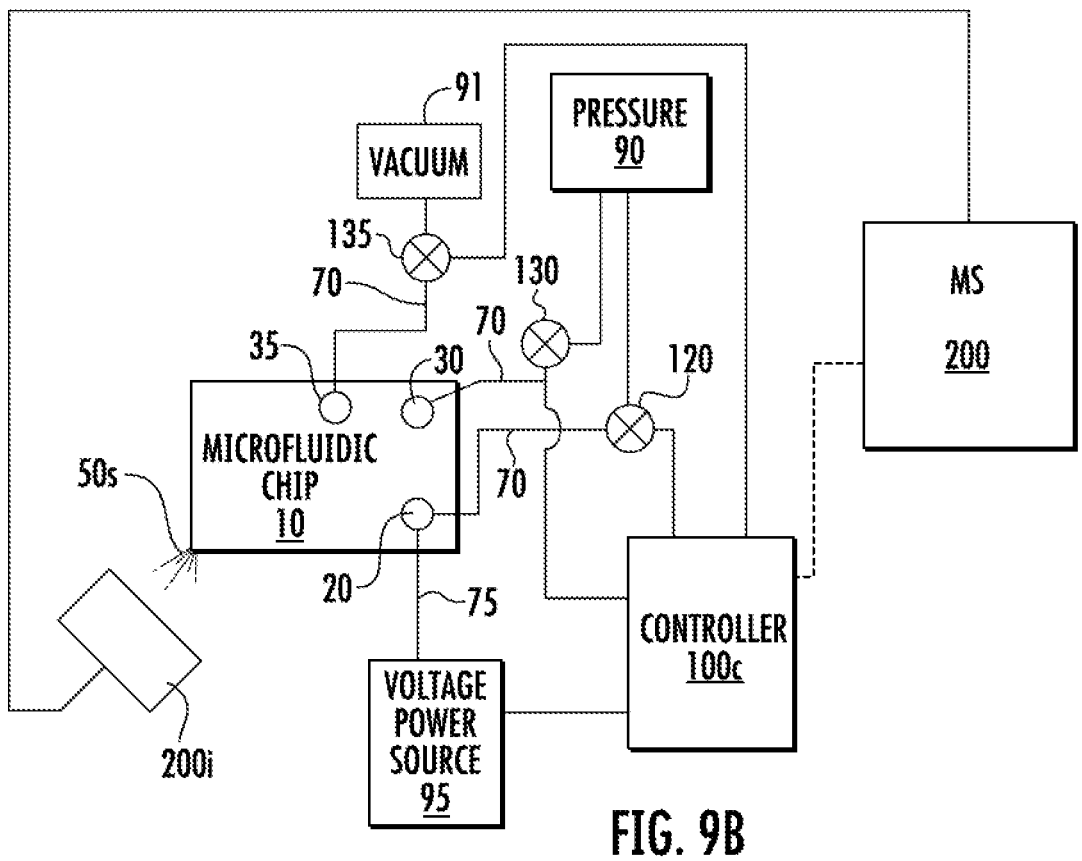
FIG. 9B is a schematic illustration of a MS in communication with a microfluidic device.

FIG. 3 illustrates that in some embodiments, the microfluidic device 10 can include a pump 40, optionally an electroosmotic (EO) pump, and at least one electrospray ionization (ESI) emitter 50 that can spray a separated sample 50s for analysis optionally to an inlet of an mass spectrometer 200i and/or to a collection device 202 (FIG. 7A). The electrospray from the at least one emitter 50 can be provided to a collection device for subsequent analysis and/or toward an inlet 200i (FIGS. 3, 6A-6C) of a mass spectrometer 200 (FIG. 9A, 9B).

The separation channel 25 is shown in FIG. 3 as having a serpentine shape but more generally, separation channel 25 can have a variety of shapes in the plane of microfluidic device 10. For example, in the plane of microfluidic device 10, the geometry of the separation channel 25 can be straight or curved, and the cross-sectional profiles of the channels do not all have to be the same. For further discussion of exemplary channel geometries and other features of microfluidic devices, see, e.g., U.S. patent application Ser. Nos. 14/001,549 and 14/368,971, the entire contents of each of which are hereby incorporated by reference herein.

One or both of the reservoirs 20, 30 can be in fluid communication with an external fluid source to provide fluid thereto during analysis and/or one or both of the reservoirs 20, 30 may be pre-loaded prior to active analysis.

As shown in FIG. 3, in some embodiments, a fluid junction 40j can be used to connect the separation/transfer channel 25 and respective pump channel 40c. The fluid junctions can be nanojunctions with associated nanojunction channels having nanometer-sized depths. These fluid junctions also typically have micrometer-sized widths. For example, nanojunctions 40j can have a depth of about 50 nm and a width of about 50 μm. The depth of the nanochannel may be selected based on the ionic strength of the buffers used in the experiment/analysis and the corresponding Debye lengths. In general, the nanochannel depth is selected to be on the order of the Debye length or smaller.

Figures 4A, 4B, 4C:
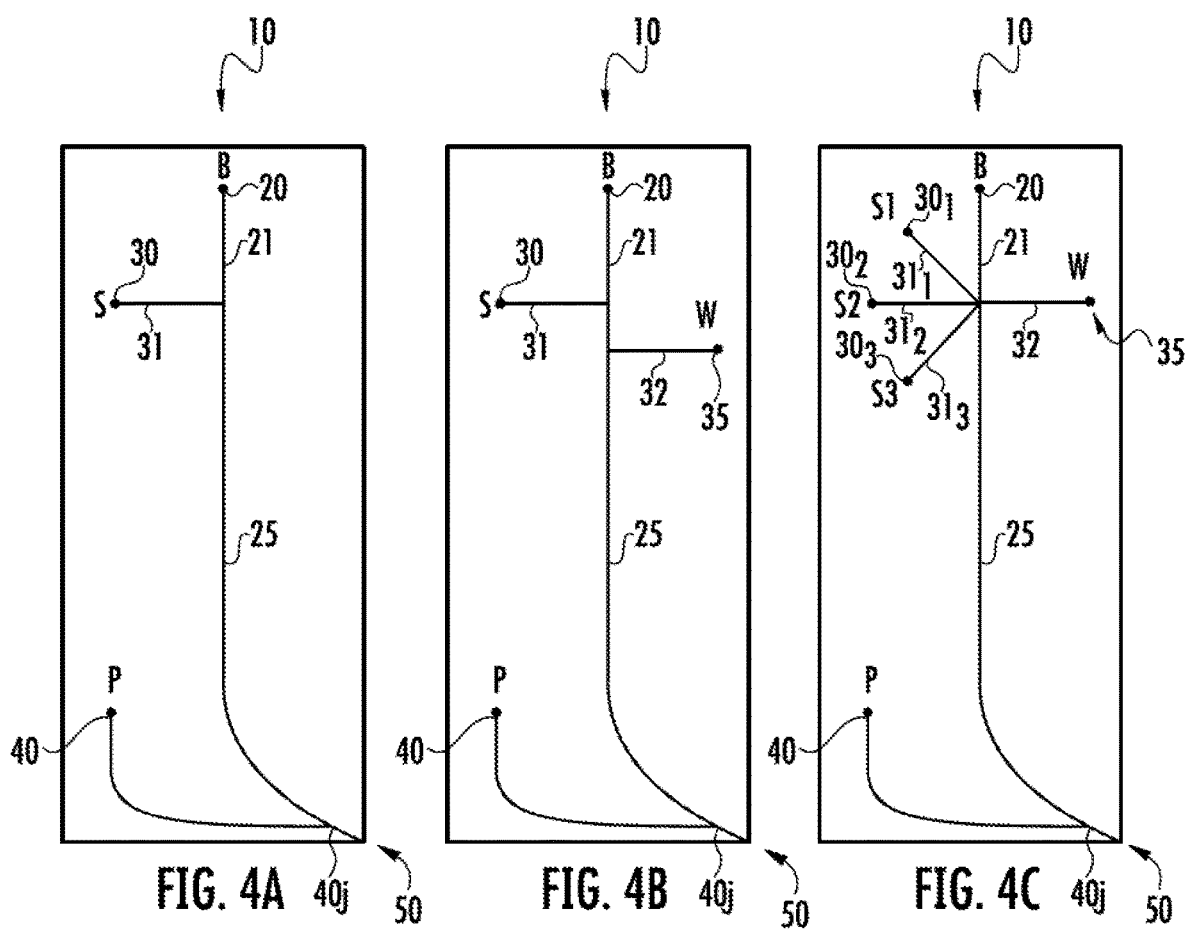
FIGS. 4A-4E are schematic illustrations of embodiments of microfluidic devices that can be configured for pressure-driven injection.

FIGS. 4A-4E show further examples of microfluidic devices 10 that can be operated as described above. FIG. 4A shows a microfluidic device 10 that does not include a waste channel 32 or waste reservoir 35. FIG. 4B shows a microfluidic device 10 with a waste channel 32 offset a longitudinal distance from the sample channel 31 across the separation channel 25. FIG. 4C shows a microfluidic device 10 with a plurality of sample reservoirs 30, shown by way of example as three, $30_1$, $30_2$, $30_3$, but more or less than three may be used. The sample reservoirs 30 can feed a common or different sample channels 31, shown in FIG. 4C as sample channels $31_1$, $31_2$, $31_3$ all for a single separation channel 25, and at least one BGE reservoir 20 (shown as a single BGE reservoir 20 and reservoir channel 21). The sample reservoirs 30 can be controlled to sequentially inject respective sample plugs into the separation channel 25. The devices 10 can optionally also have an electroosmotic (EO) pump 40.

Figure 4D:
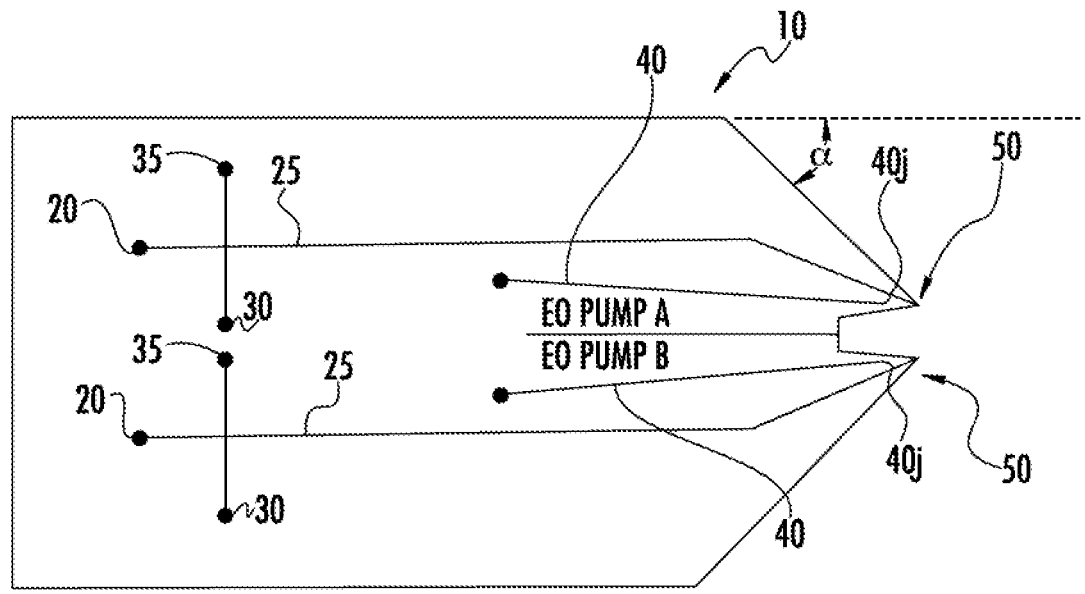

FIG. 4D illustrates an embodiment of a microfluidic device 10 that has a plurality of separation channels 25, shown as two channels, but more generally, more than two may be included on a single device 10. The separation channels 25 can feed a common emitter 50 or separate emitters. Thus, the microfluidic device 10 can include more than one separation channel and associated BGE reservoir 20, sample reservoir 30, waste reservoir 35 and cross channels 31, 32. One or more of the individual channels 21, 25, 31, 32 can have lateral dimensions of about 1-100 μm, e.g., about 75 μm and/or may be lateral spaced apart by about 1-100 mm, in some particular embodiments.

Figure 4E:
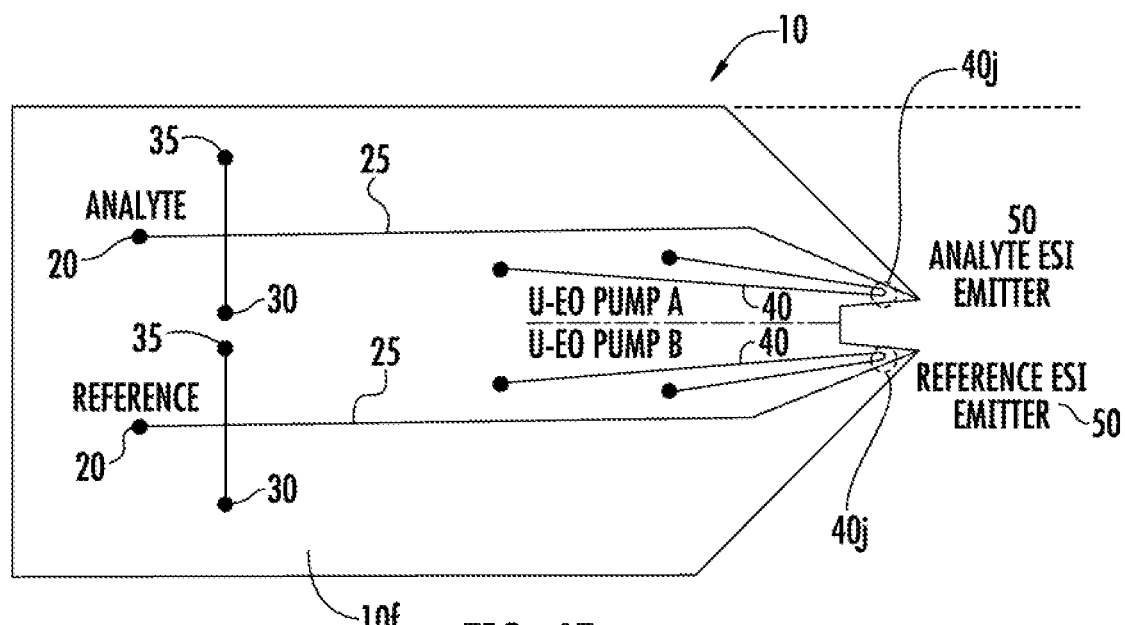

In some embodiments, as shown in FIG. 4E, one or more reference channels for a reference sample may be included on/in the microfluidic device 10. Where used, the reference sample includes one or more ions for internal calibration during analysis. In some embodiments, the reference sample provides a single defined ion for internal calibration. Alternatively, in certain embodiments, the reference sample includes multiple ions over a desired range of m/z values, typically that spans an entire m/z range of interest, to improve the accuracy of subsequent mass spectrometric analysis of sample components.

Figure 5A:
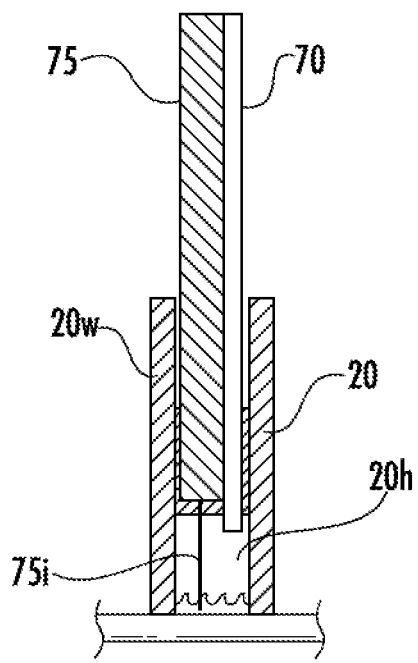
FIG. 5A is a schematic illustration of an example of a gas-tight connection with a pressurized supply line for the background electrolyte (BGE) reservoir according to embodiments of the present invention.

FIG. 5A is a schematic illustration of a BGE reservoir 20 having a gas-tight fitting holding a pressurized gas supply line 70 and a (high) voltage line 75 with a (high) voltage input electrode 75*i* (shown as a platinum wire) that extends inside the sealed reservoir 20 to make contact with the fluid in the reservoir 20. The term "gas-tight" means that the seal on the reservoir 20 does not unduly leak when operated so as to be able to provide the desired pressure in the headspace 20*h* for pressure-driven injection of fluid from reservoir 20. As shown in FIG. 6A, the sample reservoir 30 can also have a pressurized gas supply line 70 and may be connected via a gas-tight seal. The waste reservoir 35 can also have a pressurized gas supply line 70 and may be connected via a gas-tight seal.

Figure 5B:
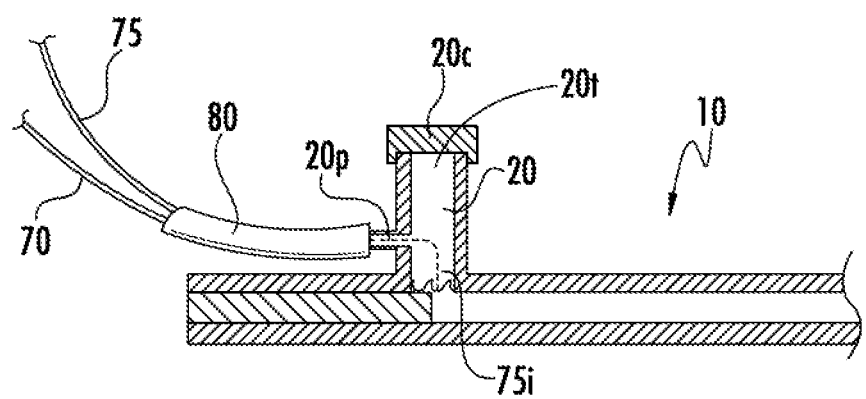
FIG. 5B is a schematic illustration of another example of a gas-tight connection between a pressurized supply line and a background electrolyte (BGE) reservoir.

The pressurized gas supply line 70 can be provided with tubing with an open pressurized gas path extending into the sealed headspace 20*h*. For an example of an 8 mm inner diameter reservoir wall 20*w*, the pressurized gas supply line can be formed by a conduit having a smaller inner diameter, e.g., ¼ inch to about 1/16 inch outer diameter. However, larger size conduits can be used and/or may be stepped down in size to connect to the reservoir. The sealed (e.g., gas-tight) connection of a respective pressurized gas supply line 70 to either reservoir 20, 30 can be provided via epoxy, O-ring, metal or elastomeric gaskets, grease fittings, and/or other suitable configurations. In some embodiments, as shown in FIG. 5B, the pressurized gas supply line 70 can be held adjacent the high voltage cable 75 in a common sleeve 80. As another alternative, the high voltage cable 75 can be held routed into the headspace while held inside the gas supply tubing.

FIG. 5B also illustrates that in some embodiments, the top of the reservoir 20*t* can be sealed with a cap 20*c* and a side port 20*p* can be used to attach the pressurized gas supply line 70 to the reservoir 20. The same arrangement can be used for the sample reservoir 30 (not shown). In some embodiments, the pressurized gas supply line 70 can be attached over the outer surface of the wall 20*w* of the reservoir 20 instead of extending inside the reservoir 20 for gas-tight or sealed connection. Other connection configurations may also be used.

FIG. 7A illustrates an example of a microfluidic system 100 which includes a controller 100*c* used to control the pressures applied to the reservoirs 20, 30, 35 to carry out the pressure-driven injection. The system 100 can include at least first and second pressurized gas supply lines/conduits 70, shown as $70_1$, $70_2$, each in fluid communication with at least one valve 120, 130. The system 100 can also optionally include a third pressurized gas supply line $70_3$ and a third valve 135 as discussed above. The system 100 can optionally include a single three-way valve (FIG. 7B) that closes and opens each supply line $70_1$, $70_2$. One or both of the valves 120, 130 as well as valve 135 can be a three-way valve (e.g., three way operation, open/close to source, open/close to head space and open/close to atmosphere) for a respective pressurized gas supply line 70 which can allow for the rapid venting of pressurized gas from a respective supply line. Thus, in operation, one or both of the valves 120, 130 can be operated to vent the head pressure in the reservoir 20, 30, to atmosphere, which may help precisely control the injection process. One or all of the pressurized gas supply lines 70 and/or reservoirs 20, 30, 35 can also or alternatively include vents (121, 131, 132) that can be electronically opened and closed, for rapid venting to atmosphere to decrease pressure in a respective headspace 20*h*, 30*h*, 35*h*. The term "rapid" with respect to the venting or pressure reduction (e.g., venting to atmosphere) in a respective pressurized supply line 70 refers to a change in pressure of the corresponding headspace 20*h*, 30*h* of a respective reservoir 20, 30 to at least atmospheric pressure within 0.1-3 seconds, more typically within about 2 seconds or within about 1 second. The rapid venting can be based on a control signal from the controller 100*c* that (a) directs the valve 120 or 130 or 135 to open to atmosphere (where a three-way valve is used) or (b) opens a vent (e.g., one or more of 121, 131, 132) separate from the valve 120, 130, 135 and closes the valve 120, 130, 135. The rapid pressure change (e.g., venting) in the BGE reservoir and/or sample reservoir 20, 30, can be measured by a pressure sensor in the supply line or reservoir to indicate the rapid drop in head pressure from an operating pressure to atmospheric pressure within a 0.1-2 second time period. In some embodiments, the rapid venting can be carried out in between about 0.1 seconds and 1.5 seconds, such as about 0.1 seconds, about 0.2 seconds, about 0.3 seconds, about 0.4 seconds, about 0.5 seconds, about 0.6 seconds, about 0.7 seconds, about 0.8 seconds, about 0.9 seconds, about 1 second, about 1.1 seconds, about 1.2 seconds, about 1.25 seconds, about 1.5 seconds, about 2 seconds, and about 2.5 seconds.

The first and second pressurized gas supply lines $70_1$, $70_2$ can each be in communication with a common pressurized gas source 90, or each may be connected to a different pressurized gas source. The system 100 can include a power supply 95 for the high voltage input to the microfluidic device 10. The power supply 95 can be attached to the cable 75.

The controller 100*c* can direct the timing sequence of the differentially applied pressures to the microfluidic device 10. The controller 100*c* communicates with the valves 120, 130, 135, with the at least one pressure source 90, with the pressure reducing device 91 (e.g., one or more pumps), and with the power supply 95. The term "controller" is used broadly to include a single or multiple processors or application specific integrated circuits (ASICs) held on a single device, e.g., the microfluidic device 10, and/or computer, laptop, notebook, smartphone and the like, or distributed in different devices using wires or wireless connections including local area networks or wide area networks, e.g., the internet, including any server system.

Figure 8:
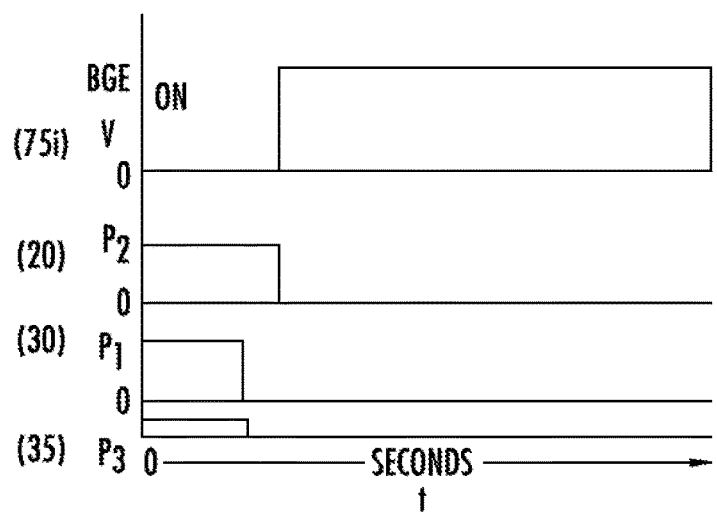
FIG. 8 is an example of a timing chart showing pressures applied to the reservoirs of a microfluidic device for injecting a sample in to a separation channel.

The controller 100*c* can direct the first and second valves 120, 130 to open and close to carry out successive sample injection and electrophoretic separation using a defined sequence, an example of which is shown in the timing chart of FIG. 8. It is noted that the electrophoretic separation voltage can be applied concurrently with or just after pressure P2 is decreased in the BGE reservoir 20. In general, sample injection is carried out using only pressure P1 applied to the BGE reservoir and only pressure P2 applied to the sample reservoir from the first and second pressurized gas supply lines 70 (e.g., tubes or conduits) without any electrokinetic (EK) voltage being applied. Voltage can be applied to the BGE reservoir 20 after the injection (FIG. 1C). Pressure reducing device 91 (e.g., one or more pumps) can apply a pressure P3 to the waste reservoir 35 during part or all of the sample loading, typically removed during the clearing and/or separation.

The controller 100*c* can be configured to operate the microfluidic device 10 using a defined timing sequence for applying defined pressures (headspace pressures) between 0.1 and 50 psi to a headspace 20*h* of the BGE reservoir 20 via the pressurized gas supply line (i.e., tube or conduit) $70_2$ and to a headspace 30*h* of the sample reservoir 30 via the pressurized gas supply line $70_1$ for defined durations, typically between 1 and 10 seconds, to inject a sample into the separation channel 25. The timing chart shown in FIG. 8 is by way of example and the noted "zero" pressures of P1 (for the sample reservoir 30) and P2 (for the BGE reservoir 20)

may be atmospheric or ambient pressures or may alternatively be below-atmospheric pressures. The applied voltage V from the power supply 95 to the input 75*i* in the BGE reservoir 20 (top line of the timing chart in FIG. 8) can have a shorter or longer duration than the concurrent injection pressures P1, P2 (FIG. 1A) or the subsequent "clearing" pressure P2 (FIG. 1B). The P2 pressure can remain constant or change, typically decreasing, from the concurrent pressure for injection to the "clearing" pressure when P1 is decreased (FIG. 1B). The pressure P3 can remain constant or change during respective sample loading cycles. The pressure P3 can be removed during clearing and/or separation, and may be reduced (or not applied) when pressure P1 is reduced.

The microfluidic device 10 can be a microfluidic chip that is formed of hard or substantially rigid materials that include, but are not limited to, substrates comprising one or combinations of: glass, quartz, silicon, ceramic, silicon nitride, polycarbonate, and polymethylmethacrylate. In particular embodiments, the device 10 can include a glass substrate such as a borosilicate. In other embodiments, a rigid polymer material may be used to form the microfluidic device. The device 10 can also include one or more layers of a soft or flexible substrate. Soft substrate materials, where used, can have a low Young's Modulus value. For example, elastomers and harder plastics and/or polymers can have a range between about 0.1-3000 MPa. Examples of soft materials include, but are not limited to, polydimethylsiloxane (PDMS), polymethylmethacrylate (PMMA), and polyurethane. See, e.g., co-pending PCT/US2012/027662 filed Mar. 5, 2012 and PCT/US2011/052127 filed Sep. 19, 2011 for a description of examples of microfabricated fluidic devices. See, also, Mellors, J. S.; Gorbounov, V.; Ramsey, R. S.; Ramsey, J. M., Fully integrated glass microfluidic device for performing high-efficiency capillary electrophoresis and electrospray ionization mass spectrometry. *Anal Chem* 2008, 80 (18), 6881-6887. For additional information that may be useful for some designs, see also, Xue Q, Foret F, Dunayevskiy Y M, Zavracky P M, McGruer N E & Karger B L (1997), Multichannel Microchip Electrospray Mass Spectrometry. *Anal Chem* 69, 426-430, Ramsey R S & Ramsey J M (1997), Generating Electrospray from Microchip Devices Using Electroosmotic Pumping. *Anal Chem* 69, 1174-1178, Chambers A G, Mellors J S, Henley W H & Ramsey J M (2011), Monolithic Integration of Two-Dimensional Liquid Chromatography—Capillary Electrophoresis and Electrospray Ionization on a Microfluidic Device. *Analytical Chemistry* 83, 842-849. The contents of these documents are hereby incorporated by reference as if recited in full herein.

Pumps and pump channels, such as, but not limited to, EO pumps and EO pump channels, can be integrated on a microfluidic device 10 for electrospray ionization via implementations other than the examples shown in FIG. 3 or 4A-4E. In general, channels can intersect at a junction, which may be a T-like junction (but not necessarily a right angle intersection). Voltages are applied to two of the three resulting channel termini generating an axial electric field through the associated channel segments. To realize hydraulic transport through the third channel segment, the electroosmotic mobility in the two channel segments that contain the axial electric field is generally different in magnitude and/or sign. The difference in electroosmotic mobility can be achieved by chemically modifying one, or both, of the associated channel segments so as to produce different surface charge densities and hence different electroosmotic mobilities. Electroosmotic mobility can also be modified by coating a channel wall with electrically neutral polymer films, thereby increasing the effective fluid viscosity within the electrical double layer at the wall. Another way to modify electroosmotic mobility is reduce one of the channel lateral dimensions to distances similar in magnitude to the Debye length of the solution being electroosmotically pumped. Other aspects of electroosmotic mobility and electroosmotic pumping are described in U.S. Pat. No. 6,110,343, the entire contents of which are hereby incorporated by reference.

While it is convenient to monolithically integrate functional pump elements on electrospray microfluidic devices, it is possible to hydraulically deliver sample materials to the emitter. See, e.g., Chambers A G, Mellors J S, Henley W H & Ramsey J M (2011) Monolithic Integration of Two-Dimensional Liquid Chromatography—Capillary Electrophoresis and Electrospray Ionization on a Microfluidic Device. *Analytical Chemistry* 83, 842-849. When utilizing hydraulic transport to supply analyte to the emitter, electrical connections for applying voltages to produce the electrospray can be implemented using a side channel similar to the EO pumping channel or by contacting the fluid using an electrode in a reservoir external to the microfluidic device, or in the case of using metal tubing between the device 10 and the pump, connection can be made to the tubing.

FIGS. 9A and 9B schematically illustrate mass spectrometry systems that include the microfluidic devices disclosed herein. FIG. 9A illustrates a portable mass spectrometer 200 with a housing 201 holding at least one of the microfluidic devices 10 with an onboard controller 100*c*, a power supply 95 to provide voltages, a pressurized gas supply 90, a detector 205, an analyzer 210 and an optional display 215 for providing output data.

FIG. 9B illustrates that the microfluidic device 10 can be in communication with a mass spectrometer 200. The controller 100*c* can be separate or partially or totally onboard the mass spectrometer 200. The term "totally onboard" means that the operational circuitry (i.e., at least one processor and programmatic instructions) can be totally integrated into the housing, control cabinet and/or operational system of the mass spectrometer.

Figure 10:
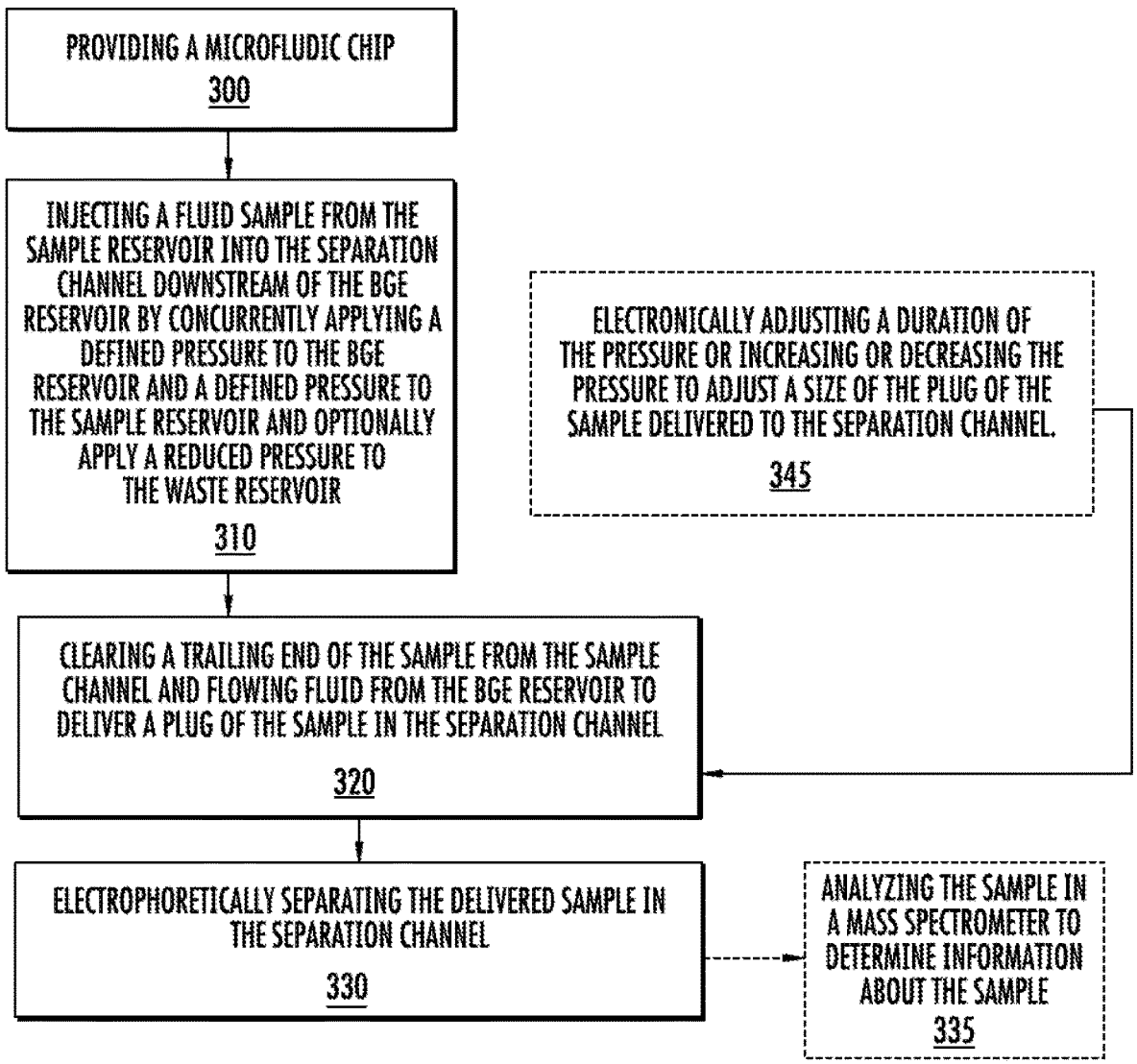
FIG. 10 is a flow chart of exemplary operations that can be used to carry out pressure-driven injection, separation, and analysis of a sample.

FIG. 10 is a flow chart of exemplary operations that can be used to carry out a sample analysis. A microfluidic device is provided (block 300). The microfluidic device can have at least one separation channel in fluid communication with a background electrolyte (BGE) reservoir and a sample reservoir and having a sample channel that merges into the separation channel. A fluid sample is injected from the sample reservoir into the separation channel downstream of the BGE reservoir by concurrently applying a defined pressure to the BGE reservoir and a defined pressure to the sample reservoir and optionally applying a reduced pressure (i.e., a pressure less than that then applied to the BGE or sample reservoir, optionally evacuated) to the waste reservoir (block 310). Then, a trailing end of the sample is cleared from the sample channel and fluid is flowed from the BGE reservoir to deliver a plug of the sample in the separation channel (block 320). The clearing can be in response to reducing or removing the pressure applied to the sample reservoir while applying pressure to the BGE reservoir so that pressure applied to the BGE reservoir is greater than pressure then applied to the sample reservoir.

Then, the delivered sample is electrophoretically separated in the separation channel (block 330). The separation can be carried out by applying voltages to the BGE reservoir and to a downstream location of the separation channel and/or a pump channel. The electrophoretic separation can be carried out by only applying an electric field to the fluidic device so that at least a component of the electric field is parallel to an axial direction of a portion of the separation channel. Alternatively, the sample can be flowed through the sample channel without applying a voltage to the sample reservoir, to the BGE reservoir, or to the waste reservoir and/or with no electrical potential gradient in any of the sample channel, the BGE channel and the waste channel.

Where electrophoretic separation is carried out using the applied electric field, the pressure in the BGE reservoir can be held constant or reduced while the voltage is applied.

Optionally, the injecting, clearing and electrophoretic separation can be carried out without applying a voltage to the sample reservoir and no electrical potential gradient in the sample channel.

Optionally, the period of time during which the various pressures are applied can be increased or decreased (e.g., electronically adjusted) and/or magnitude of the pressure applied can be increased or decreased to adjust a size of the plug of the sample delivered to the separation channel (block 345).

Optionally, after undergoing separation, the sample can be analyzed in a mass spectrometer to determine information about the sample (block 335). The analysis can include detecting analyte peak signals of the sample using a mass spectrometer and generating electropherograms of the sample, for example.

Electronic detection of signal of the separated sample in the separation channel can be performed using a detector in communication with the separation channel (optically and/or electronically). The electronic detection can be carried out without the mass spectrometer detection or with the mass spectrometer detection. In some embodiments, the electronic detection by the detector is carried out simultaneously with detection by the mass spectrometer for a respective separated sample.

Optionally, sample pre-conditioning, transport, and injection steps can be carried out using only a sequence of defined pressure inputs to the BGE channel, the sample channel and the waste channel, without applying voltages or generating electric fields.

It is noted that embodiments of the present invention may combine software, firmware and/or hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

Embodiments of the present invention are described herein, in part, with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, or a block divided and performed separately, depending upon the functionality involved.

Figure 11:
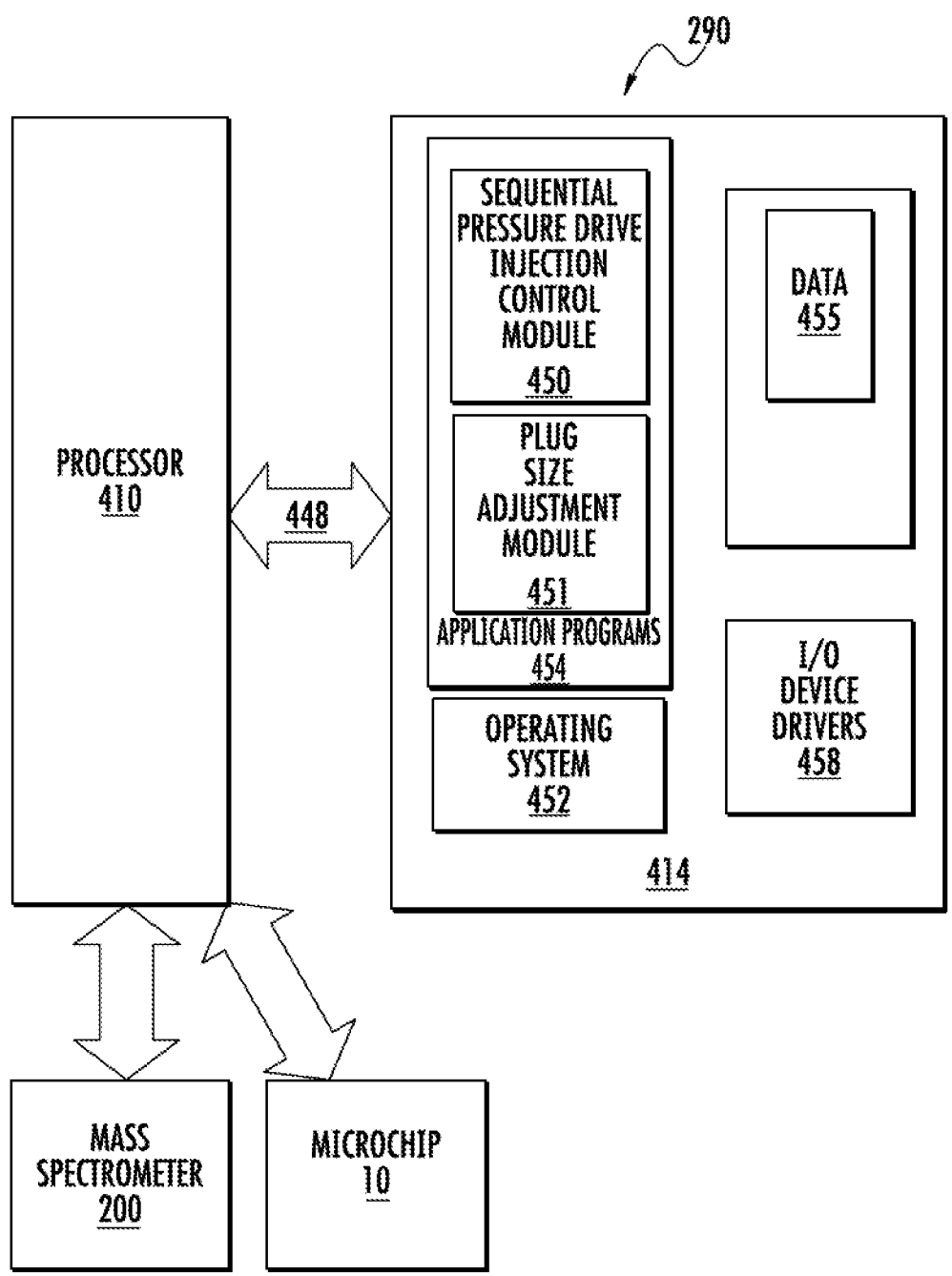
FIG. 11 is a block diagram of a data processing system that can be implemented as part of the devices and systems disclosed herein.

FIG. 11 is a schematic illustration of a circuit or data processing system 290. The system 290 can be used with microfluidic devices 10 and/or mass spectrometers 200. The circuits and/or data processing systems 290 may be incorporated in a digital signal processor in any suitable device or devices. As shown in FIG. 11, the processor 410 can communicate with a mass spectrometer 200 and/or microfluidic device 10 and with memory 414 via an address/data bus 448. The processor 410 can reside in a control circuit or controller that is separate from the spectrometer 200 or that is integrated wholly or partially therein. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

FIG. 11 illustrates that the memory 414 may include several categories of software and data used in the data processing system: the operating system 452; the application programs 454; the input/output (I/O) device drivers 458; and data 455. The data 455 can include sample type, plug size adjustments for pressures, calibration data, time synchronization data (e.g., pressures/duration for loading/injection), and/or other detected or internal mass spectrometer data.

As will be appreciated by those of skill in the art, the operating systems 452 may be any operating system suitable for use with a data processing system, such as OS/2, AIX, DOS, OS/390 or System390 from International Business Machines Corporation, Armonk, N.Y., Windows CE, Windows NT, Windows95, Windows98, Windows2000, WindowsXP or other Windows versions from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 455 and certain memory 414 components. The application programs 454 are illustrative of the programs that implement the various features of the data (image) processing system and can include at least one application, which supports operations according to embodiments of the present invention. Finally, the data 455 represents the static and dynamic data used by the application programs 454, the operating system 452, the I/O device drivers 458, and other software programs that may reside in the memory 414.

In FIG. 11, Sequential Pressure Drive Injection Control Module 450 and Plug Size (pressure/duration) Adjustment Module 451 are application programs. More generally, however, other configurations may also be utilized. The Module 451 can allow for a user to select a desired injection time (Pressure ON time, OFF time, pressure for a respective injection and/or clearing and the like, for each reservoir). The Module 450 and/or 451 may also be incorporated into the operating system 452, the I/O device drivers 458 or other such logical division of the data processing system. Thus, the present disclosure should not be construed as limited to the configuration of FIG. 11, which is intended to encompass any configuration capable of carrying out the operations described herein. Further, Module 450 and/or 451 can communicate with or be incorporated partially or completely in other components, such as a mass spectrometer 200, power supply 95, an interface/gateway or a computer such as at a workstation that may be local or remote from the microfluidic device/spectrometer.

The I/O data port can be used to transfer information between the data processing system, the workstation, the spectrometer, the microfluidic device, the interface/gateway and another computer system or a network (e.g., the Internet) or to other devices or circuits controlled by the processor. These components may be conventional components such as those used in many conventional data processing systems, which may be configured in accordance with the present invention to operate as described herein.

The present invention is explained in greater detail in the following non-limiting Examples.

Examples

Microchip CE with integrated ESI for MS detection was used for the analysis of amino acids. The new pressure-driven injection method was compared to a conventional electrokinetic (EK) gate method (using the methodology described in FIGS. 1A-1C and 2A-2C) using the microfluidic device shown in FIG. 3. For all of the data presented here, the sample contained a 10 µM mixture of the 20 essential amino acids. The salt content of the samples was varied to illustrate the superior salt tolerance of the new injection method and also to illustrate transient isotachophoresis (tITP), which can be performed together with the pressure-driven injection methods disclosed herein. All separations were performed with a separation field strength of approximately 1000 V/cm with a background electrolyte (BGE) of 50% methanol, 2% formic acid (pH 2.2). For pressure-driven injection, a pressure of 2 psi was applied to the head space of the sample and BGE reservoirs. The pressure was controlled using one 3-way electronic valve (obtained from Clippard, Cincinnati, Ohio) for each of these two reservoirs. The valves were controlled using the same computer control system used to supply high voltage to the microfluidic device. Gas tight connections were made to the microfluidic reservoirs using PTFE tubing with an internal diameter equal to the diameter of the glass cylinders used as fluid reservoirs (8 mm). For the sample reservoir connection, the PTFE tubing was connected directly to the pressure supply line using a simple reducing union. The fitting used for the BGE reservoir is illustrated in FIG. 5A. To allow the application of both high voltage and pressure, this fitting includes the high voltage electrode and a segment of 1/16 inch tubing which is coupled to a pressure supply line. A Synapt G2 quadrupole-ion mobility-time of flight mass spectrometer (obtained from Waters Corp., Milford, Mass.) was used for detection and identification of the ions generated by the microchip CE-ESI device.

Figure 12A:
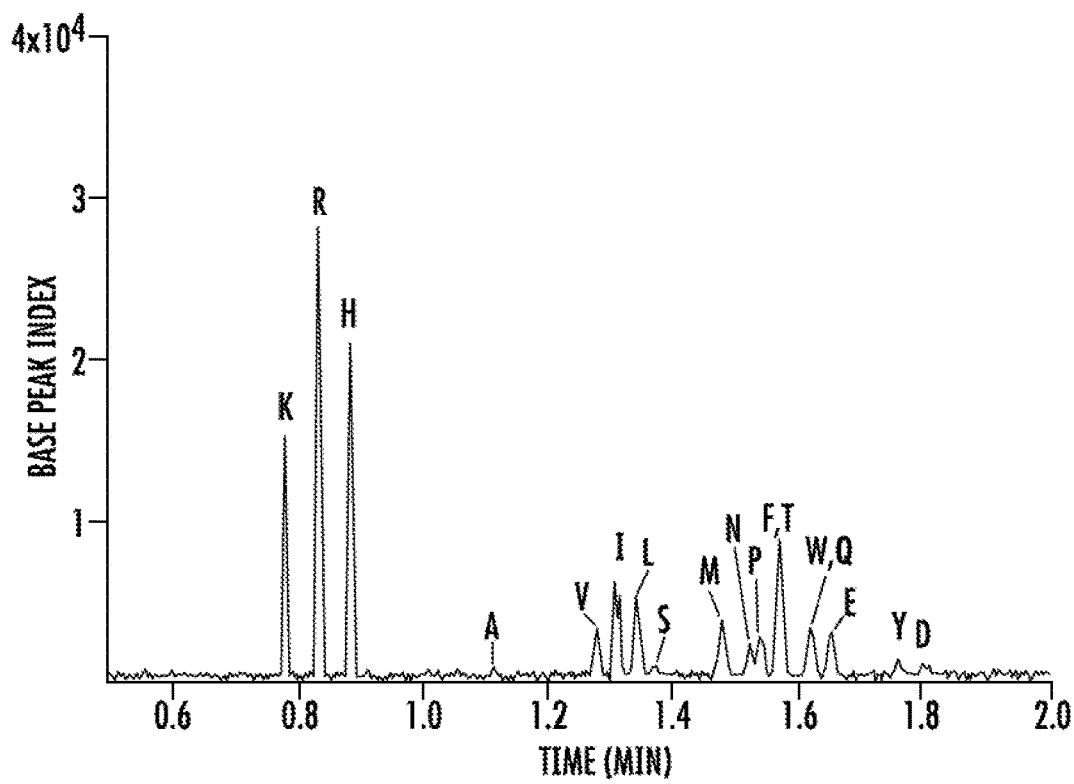
FIGS. 12A and 12B are electropherograms for a microfluidic CE-ESI-MS (Capillary Electrophoresis-Electrospray Ionization-Mass Spectrometry) analysis of an amino acid mixture prepared in a background electrolyte (BGE) solution with no salt added to the solution.
Figure 12B:
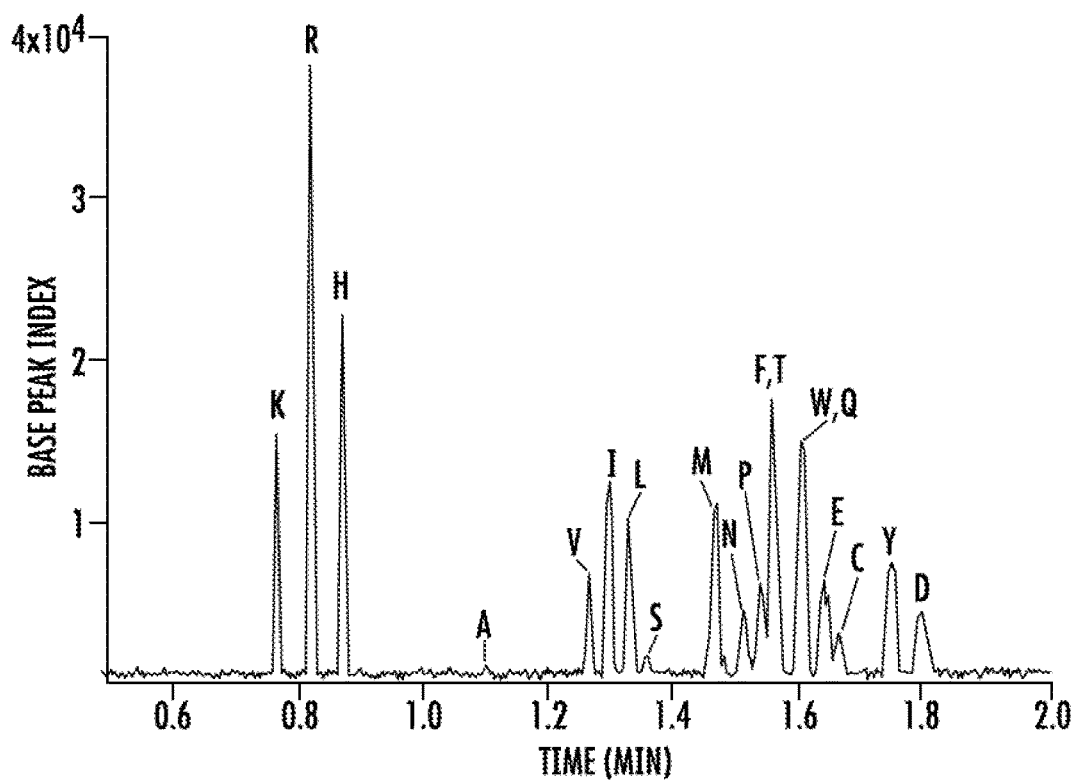

FIGS. 12A and 12B show electropherograms for the separation of sample with low salt content using both injection methods. The electropherograms are for the microfluidic CE-ESI-MS analysis of an amino acid mixture prepared in BGE with no salt added. For the pressure-driven injection (FIG. 12B), 2 psi was applied to both the sample and BGE reservoirs for 3 seconds, then just the BGE reservoir for 1 second. For the EK gated injection (FIG. 12A), the gate was opened for 0.2 seconds using the voltages shown in FIGS. 2A-2C. The effects of injection bias can be seen in FIG. 12A as relatively smaller peaks for the later eluting amino acids in the EK gated electropherogram. For the electrokinetic injection, injection bias causes the later eluting compounds to be significantly smaller. The new pressure driven injection method has no electrokinetic bias, so the peak areas are more consistent for analytes. Differences in peak area for the pressure driven injection are caused purely by differences in the MS detector response for these different analytes.

Figure 13:
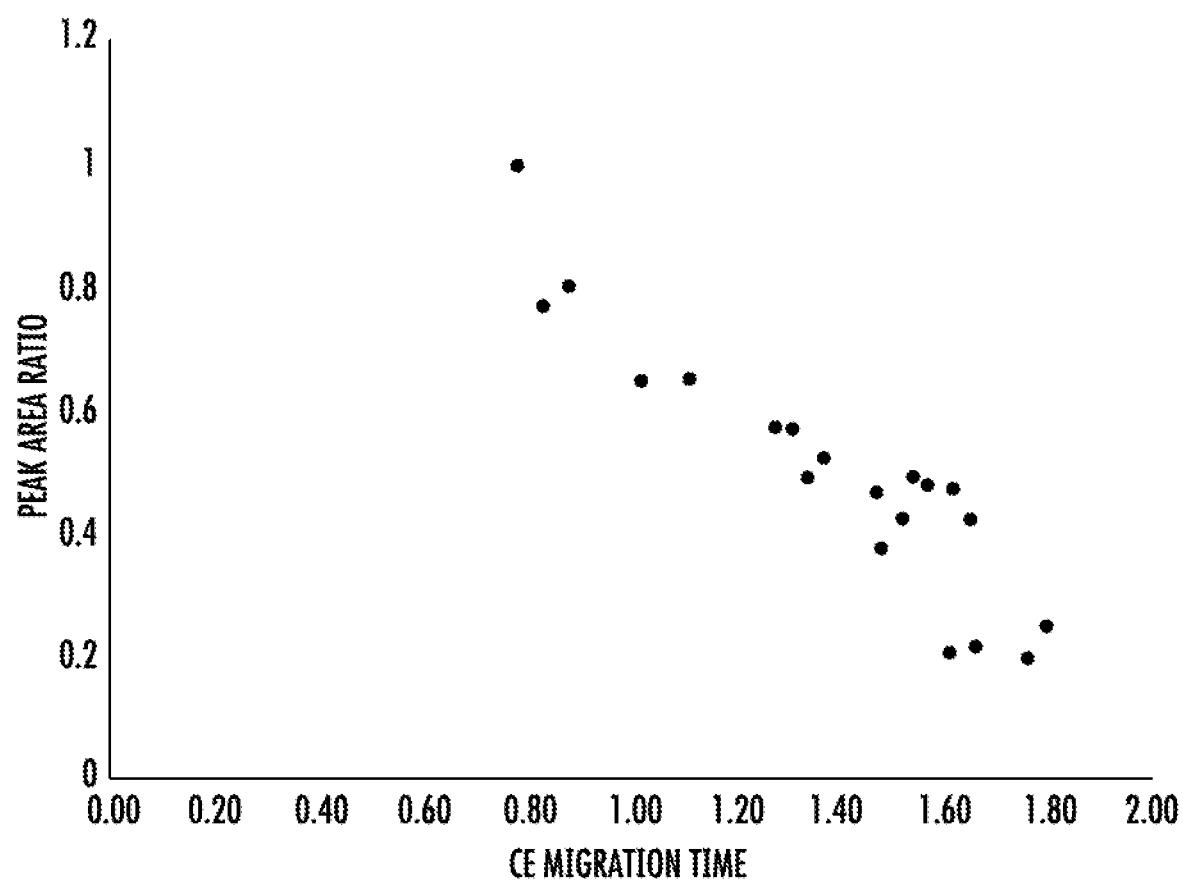
FIG. 13 is a graph showing peak area ratio versus capillary electrophoresis migration time from electrokinetically gated injection of a sample relative to peak areas from pressure-driven injection of the sample.

To illustrate this trend more clearly, the peak areas from the EK gated injection relative to the peak areas of the pressure driven injection are plotted in FIG. 13. The most mobile amino acid (lysine, K) had the same peak area using both injection methods. There is, however, a clear trend of decreasing relative peak area with longer migration times.

The relative decrease in peak area as a function of migration time illustrates how analytes with slower electrophoretic mobility are more strongly influenced by bias when using the electrokinetically gated injection.

Injection method comparison for a sample with high salt content showed that the EK injection method had a more severe type of injection bias that can occur when the ionic strength of the sample is significantly greater than the ionic strength of the BGE. In this case, current flow from the sample reservoir to the separation channel was limited by the ionic conductivity of the BGE. An excess of ions from salt in the sample will prevent analyte ions from migrating into the separation channel. The end result is a severely biased injection when the ionic strength of the sample is significantly higher than the ionic strength of the BGE. This phenomenon places a major limitation on the utility of EK-gated CE separations. Pressure-driven injection methods force samples into the separation channel without regard for the electrical conductivity of the BGE, so analyte injection is not hampered by the salt content of the sample.

Figure 14A:
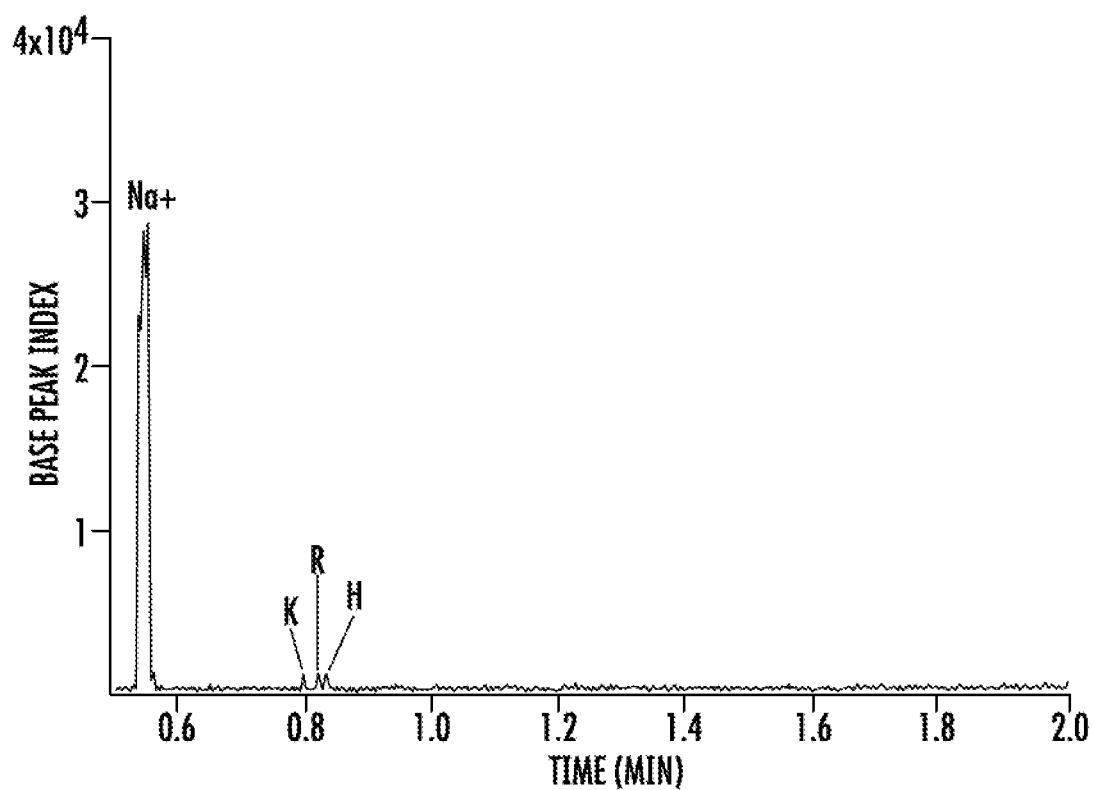
FIGS. 14A and 14B are electropherograms obtained from microfluidic CE-ESI-MS analysis of an amino acid mixture prepared in BGE solution with 100 mM sodium chloride added to the solution.
Figure 14B:
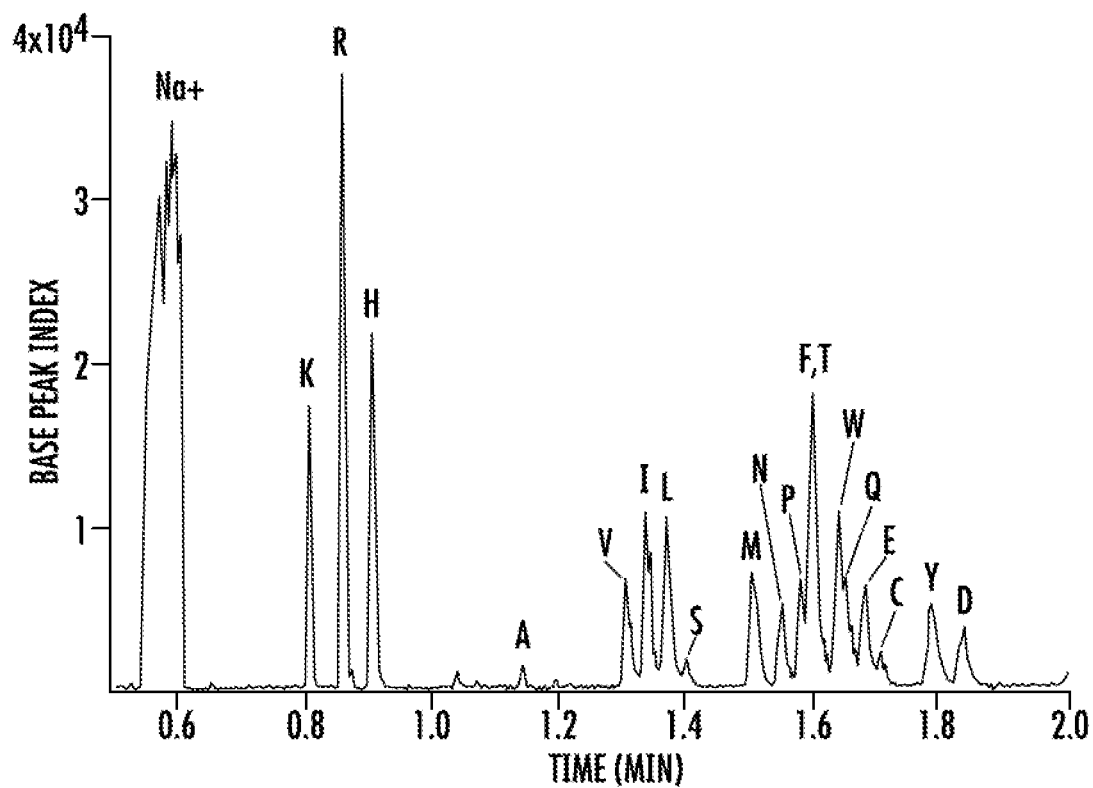

FIGS. 14A and 14B show electropherograms obtained from the analysis of a sample containing 100 mM sodium chloride using both injection methods. Sodium ions generate clusters of sodium formate during the electrospray process which can be detected by the mass spectrometer. For the EK injection (FIG. 14A), only the band of sodium and very small amounts of the highest mobility amino acids (K, R, and H) are detected. For the new pressure driven injection method (FIG. 14B), an even larger band of sodium is detected, but in this case all of the amino acids are also detected with similar intensity to the injection of the no-salt-added sample shown in FIG. 12B.

The use of salt in the sample for transient isotachophoresis was investigated. The ability to position a well-defined band of sample into the separation channel of the microfluidic device using pressure-driven flow allows the use of online sample focusing methods that are more difficult (or even not possible) using other microfluidic injection methods. Transient isotachophoresis (tITP) has been previously described as an online sample focusing method for capillary electrophoresis, and can be used when the sample contains a relatively large concentration of an electrolyte (termed the leading electrolyte) that has higher electrophoretic mobility than the analyte ions. This is exactly the situation that exists for the pressure-driven injection of samples with high concentration of sodium chloride described above. To take advantage of the sample focusing effects of tITP a larger band of this sample is typically injected. The pressure-driven injection methods disclosed herein allow complete freedom in altering the size of the sample band, simply by changing the head pressure or the duration of the sample loading step. For the results presented in FIGS. 15A and 15B, the duration of the sample loading step was altered, while holding constant all other variables.

Figure 15A:
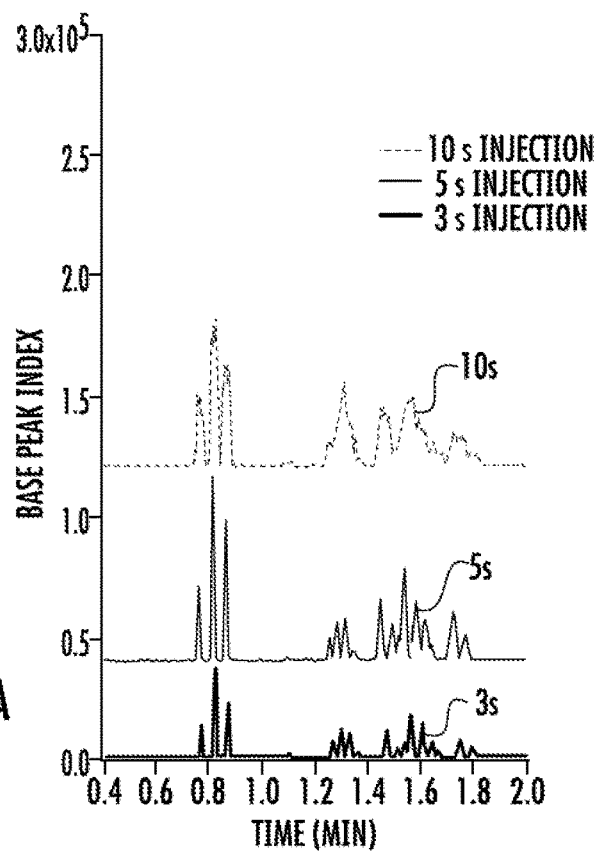
FIGS. 15A and 15B are electropherograms of base peak index as a function of time for different injection times (3 seconds, 5 seconds and 10 seconds).
Figure 15B:
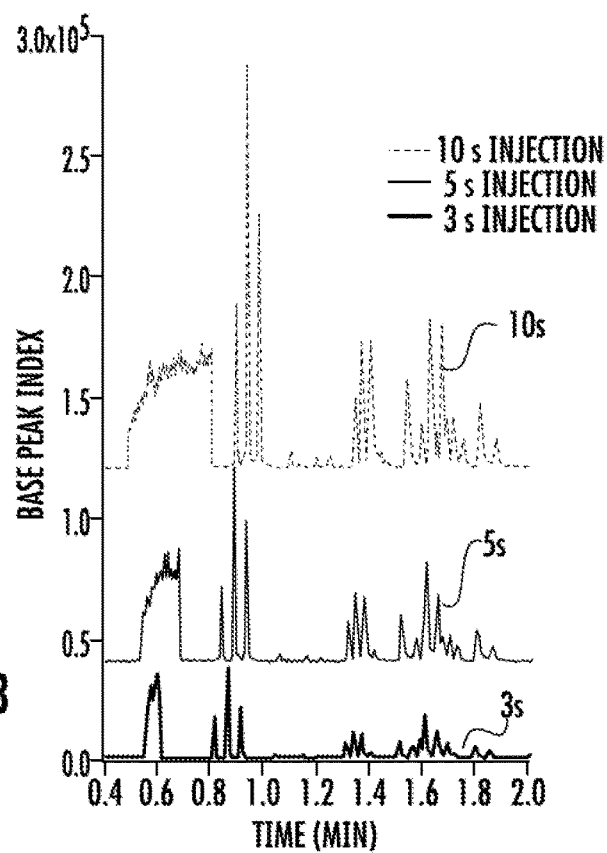

FIGS. 15A and 15B show how tITP yields sharp bands of increasing concentration when larger amounts of samples containing a sufficient concentration of leading electrolyte are injected. The electropherograms on the left (FIG. 15A) show how the analyte bands simply become wider for longer injection times without tITP. This sample contained no added salt to the BGE. The electropherograms of FIG. 15B show how the analyte bands focus into narrow bands of increasing concentration when tITP is performed. The only difference between the two sets of runs was the addition of 100 mM sodium chloride to the sample used for the runs in FIG. 15B. A sodium peak can be seen in the data of FIG. 15B as a wide band that elutes before the amino acids. This shows how the leading electrolyte band does not focus during tITP while the less mobile analyte ions focus into sharp peaks. The effect of salt content on microchip tITP-CE-ESI-MS was based on a mixture of 20 amino acids (10 uM). The electropherograms of FIG. 15B show how tITP leads to sharp peaks of increasing concentration when larger amounts of a sample containing a sufficient concentration of leading electrolyte are loaded. The sample of FIG. 15B contained 100 mM sodium chloride. These injections were performed with a head pressure of 2 psi applied to the sample reservoir for the times indicated in the legend. All other conditions were identical for all of the electropherograms.

Figure 16A:
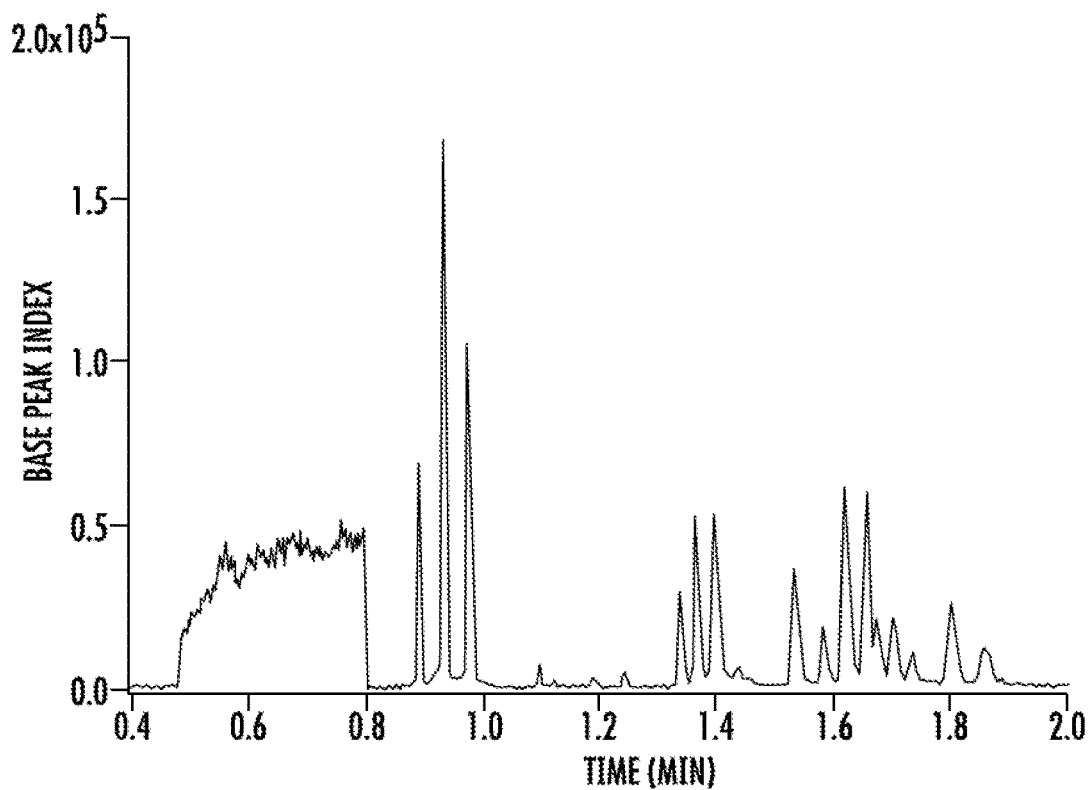
FIGS. 16A and 16B are electropherograms for tITP-CE-ESI-MS separation and analysis of amino acid samples with two different leading electrolytes added to the sample.
Figure 16B:
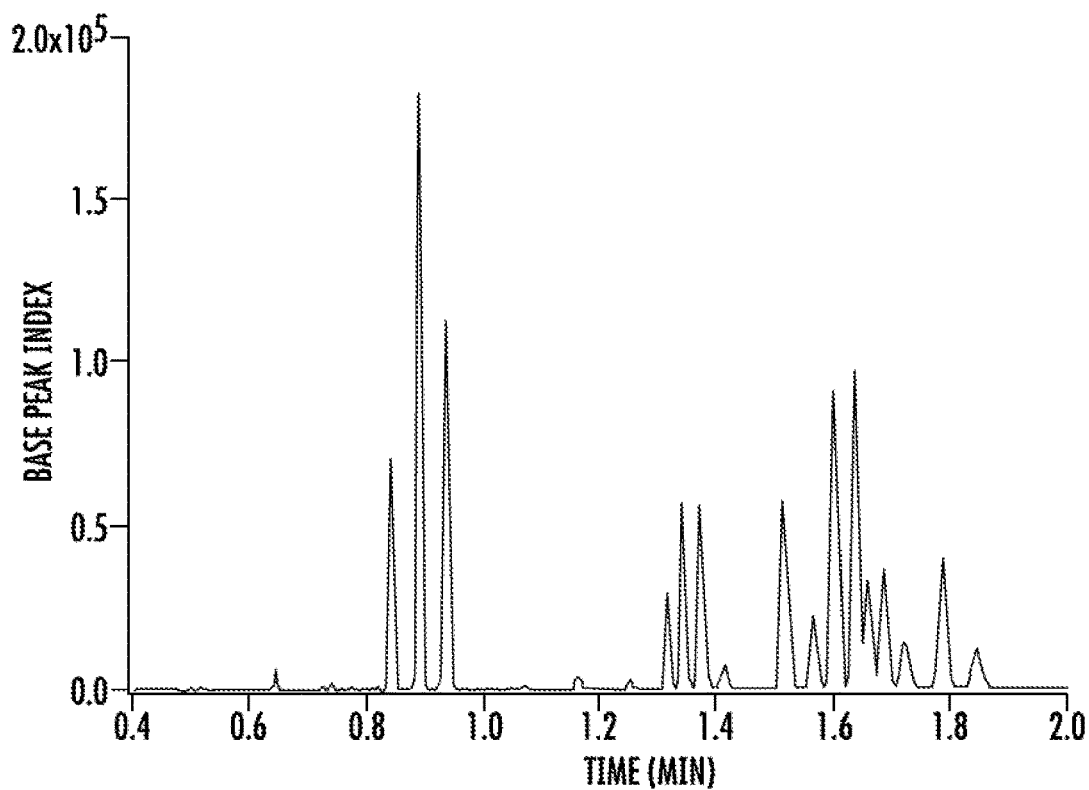

While 100 mM sodium chloride yields satisfactory results for tITP-CE-ESI-MS, other electrolytes can be used. For certain samples, better separation performance can be achieved by using ammonium acetate instead of sodium chloride. FIGS. 16A and 16B show electropherograms from two tITP-CE-ESI-MS separations. Both samples were 10 μM amino acid mixtures injected for 10 seconds at 2 psi. The sample used for the electropherogram of FIG. 16A contained 100 mM sodium chloride, while the sample used for the electropherogram of FIG. 16B used 100 mM ammonium acetate. The sample injected with sodium chloride yielded abnormal peak shapes, with abnormalities visible at the bottoms of the amino acid peaks. The amino acid peaks for the sample containing ammonium acetate had much better (i.e., expected) shapes. This improvement in peak shape yielded better resolution between neighboring peaks.

Another difference was that ammonium ions yielded a volatile salt during the ESI process, so they were not detected by ESI-MS like sodium ions. Ammonium ions are therefore less likely to cause fouling of the MS inlet electrodes. Ammonium ions also have a higher electrophoretic mobility than sodium ions, which allows the tITP process to occur more quickly, yielding less migration time delay. This effect can be observed by comparing the migration time of the earliest eluting amino acid (lysine) in the two runs shown in FIGS. 15A and 15B. The migration time was 3 seconds earlier for this example. The effect would be more significant for larger sample injection volumes.

As discussed above, the pressure-driven injection methods disclosed herein allow injection of samples for microfluidic CE separations that are free of electrokinetic injection bias. These methods can be used to inject a cleanly-defined band of sample regardless of the sample composition. The size of the sample band can be precisely controlled simply by altering the pressure and/or duration of the injection. These potential advantages make the injection methods ideal for performing on-chip sample focusing methods such as transient isotachophoresis. Pressures can be applied to two different solvent reservoirs, with the ability to control those pressures independently using (typically off-chip) valves. This allows precise loading of samples into the separation channel and then clearing of extra sample material from the side arms of the injection cross in two discrete steps, driven only by applied pressure.

The foregoing description is only illustrative and is not to be construed as limiting. Although a few exemplary embodiments have been described, those skilled in the art will readily appreciate that many modifications are possible without materially departing from the scope of the disclosure. The invention is defined by the following claims, with equivalents of the claims to be included therein.

That which is claimed:

1. A method of sample processing, comprising:
providing a microfluidic device with at least one separation channel in fluid communication with a background electrolyte (BGE) reservoir, and a sample reservoir connected to the separation channel through a sample channel;
injecting a fluid sample from the sample reservoir into the at least one separation channel by concurrently applying pressurized gas to the BGE reservoir and the sample reservoir;
delivering fluid from the BGE reservoir into the at least one separation channel to define a plug of the sample in the at least one separation channel by reducing a gas pressure in the sample reservoir, so that a gas pressure in the BGE reservoir is greater than the gas pressure in the sample reservoir;
concentrating an analyte component of the sample within the at least one separation channel; and
performing at least one of:
(a) electrospraying the concentrated analyte component from at least one emitter in fluid communication with the at least one separation channel; and
(b) measuring an electrical signal corresponding to the concentrated analyte component in or emerging from the separation channel.

2. The method of claim 1, wherein the microfluidic device comprises a waste reservoir connected to the separation channel through a waste channel, the method further comprising maintaining a gas pressure differential between the sample reservoir and the waste reservoir to inject the fluid sample.

3. The method of claim 2, wherein the waste reservoir is connected to the at least one separation channel at a location downstream from a location at which the sample channel is connected to the at least one separation channel.

4. The method of claim 1, wherein concentrating the analyte component comprises performing transient isotachophoresis to concentrate the analyte component.

5. The method of claim 4, comprising introducing a leading electrolyte solution into the sample prior to injecting the sample.

6. The method of claim 5, wherein the leading electrolyte solution has a higher electrophoretic mobility than the analyte component of the sample.

7. The method of claim 5, wherein the leading electrolyte solution comprises a concentration of an electrolyte species that is at least 5 times larger than a concentration of the electrolyte species in the sample.

8. The method of claim 4, comprising introducing a leading electrolyte solution into the at least one separation channel prior to injecting the sample.

9. The method of claim 8, wherein the leading electrolyte solution has a higher electrophoretic mobility than the analyte component of the sample.

10. The method of claim 1, wherein the injecting is performed without applying a voltage to the sample reservoir.

11. The method of claim 1, comprising adjusting a duration of the pressure applied to at least one of the sample reservoir and the BGE reservoir to adjust a volume of the injected sample.

12. The method of claim 1, comprising clearing a trailing end of the injected sample from the sample channel and flowing fluid from the BGE reservoir into the at least one separation channel to inject the sample as a plug.

13. The method of claim 12, wherein clearing the trailing end of the injected sample comprises applying a higher gas pressure to the BGE reservoir than to the sample reservoir.

14. The method of claim 1, further comprising discharging the concentrated analyte component from the microfluidic device via at least one emitter on the microfluidic device toward at least one of a collection device or an entrance of a mass spectrometer.

15. The method of claim 14, comprising discharging the concentrated analyte component by electro-osmotic pumping.

16. The method of claim 1, wherein the gas pressure within the BGE reservoir and the sample reservoir during the injection of the sample are each between 0.1 psi and 50 psi.

17. The method of claim 1, wherein reducing the gas pressure in the sample reservoir comprises venting gas from the sample reservoir.

18. The method of claim 1, wherein the sample comprises at least one member of the group consisting of amino acids, polar metabolites, charged molecules, peptides, and proteins.

19. The method of claim 1, wherein one or more components of the sample are derived from at least one member of the group consisting of biofluids, blood, serum, urine, dried blood, cell growth media, lysed cells, beverages, and food.

20. The method of claim 1, wherein the measured electrical signal corresponds to ions of the concentrated analyte component.

* * * * *